(12) United States Patent
Camacho-Cook et al.

(10) Patent No.: US 9,392,743 B2
(45) Date of Patent: Jul. 19, 2016

(54) AGRICULTURAL AUTONOMOUS VEHICLE PLATFORM WITH ARTICULATED BASE

(71) Applicant: RowBot Systems LLC, Minneapolis, MN (US)

(72) Inventors: Matthew Camacho-Cook, Norwalk, CT (US); John E. Bares, Gibsonia, PA (US); Kent Cavender-Bares, St. Paul, MN (US)

(73) Assignee: RowBot Systems LLC, Minneapolis, MN (US)

( * ) Notice: Subject to any disclaimer, the term of this patent is extended or adjusted under 35 U.S.C. 154(b) by 0 days.

(21) Appl. No.: 14/459,970

(22) Filed: Aug. 14, 2014

(65) Prior Publication Data

US 2015/0051779 A1 Feb. 19, 2015

Related U.S. Application Data

(60) Provisional application No. 61/865,855, filed on Aug. 14, 2013.

(51) Int. Cl.
| | |
|---|---|
| *B62D 6/00* | (2006.01) |
| *A01C 15/00* | (2006.01) |
| *B62D 53/02* | (2006.01) |
| *A01B 69/04* | (2006.01) |

(52) U.S. Cl.
CPC ............... *A01C 15/00* (2013.01); *A01B 69/008* (2013.01)

(58) Field of Classification Search
CPC .. A01C 21/002; A01C 21/007; A01C 21/005; A01C 23/023
USPC ........ 701/23, 50, 25; 111/149, 170, 900, 193, 111/135
See application file for complete search history.

(56) References Cited

U.S. PATENT DOCUMENTS

| | | | |
|---|---|---|---|
| 2,992,090 | A | 7/1961 | Littler |
| 3,945,332 | A | 3/1976 | Wirsbinski |
| 3,970,012 | A | 7/1976 | Jones, Sr. |
| 4,015,366 | A | 4/1977 | Hall, III |
| 4,197,690 | A | 4/1980 | Eistert |
| 4,482,960 | A | 11/1984 | Pryor |

(Continued)

FOREIGN PATENT DOCUMENTS

| | | |
|---|---|---|
| EP | 2267567 | 12/2010 |
| EP | 2319285 | 5/2011 |

(Continued)

OTHER PUBLICATIONS

10 Radically Innovative College Programs. Oct. 1, 2009. *Popular Mechanics*. Accessed Jan. 6, 2015 http://www.popularmechanics.com/science/3491456?src=soc_fcbk.

(Continued)

*Primary Examiner* — Marthe Marc-Coleman
(74) *Attorney, Agent, or Firm* — Patterson Thuente Pedersen, P.A.

(57) ABSTRACT

An autonomous vehicle platform and system for selectively performing an in-season management task in an agricultural field while self-navigating between rows of planted crops, the autonomous vehicle platform having a vehicle base with a width so dimensioned as to be insertable through the space between two rows of planted crops, the vehicle base having a first portion and a second portion, wherein the first portion is pivotably coupled to the second portion, and each of portion is operably coupled to at least one ground engaging wheel.

20 Claims, 16 Drawing Sheets

(56) References Cited

U.S. PATENT DOCUMENTS

| | | | |
|---|---|---|---|
| 4,525,988 A | 7/1985 | Harlan | |
| 4,612,996 A | 9/1986 | Wolf et al. | |
| 4,614,160 A | 9/1986 | Curlett | |
| 4,628,633 A | 12/1986 | Nilsson | |
| 4,630,773 A * | 12/1986 | Ortlip | 239/1 |
| 4,637,328 A | 1/1987 | Topham et al. | |
| 4,769,700 A | 9/1988 | Pryor | |
| 4,919,060 A | 4/1990 | Cady | |
| 4,967,362 A | 10/1990 | Schutten | |
| 5,033,397 A | 7/1991 | Colburn, Jr. | |
| RE34,080 E | 9/1992 | Schmidt | |
| 5,185,990 A | 2/1993 | Barnes et al. | |
| 5,220,876 A | 6/1993 | Monson et al. | |
| 5,353,724 A | 10/1994 | Wheeley, Jr. | |
| 5,397,056 A | 3/1995 | Sakatani et al. | |
| 5,410,479 A | 4/1995 | Coker | |
| 5,442,552 A | 8/1995 | Slaughter et al. | |
| 5,467,271 A | 11/1995 | Abel et al. | |
| 5,520,125 A | 5/1996 | Thompson et al. | |
| 5,651,500 A | 7/1997 | Patterson et al. | |
| 5,661,817 A | 8/1997 | Hatlestad et al. | |
| 5,668,719 A * | 9/1997 | Bobrov et al. | 702/2 |
| 5,754,137 A | 5/1998 | Durrstein | |
| 5,923,270 A | 7/1999 | Sampo et al. | |
| 5,974,348 A | 10/1999 | Rocks | |
| 6,129,226 A * | 10/2000 | Donovan | B66C 23/54 |
| | | | 212/238 |
| 6,141,614 A | 10/2000 | Janzen et al. | |
| 6,148,255 A | 11/2000 | van der Lely | |
| 6,199,000 B1 | 3/2001 | Keller et al. | |
| 6,236,907 B1 | 5/2001 | Hauwiller et al. | |
| 6,266,595 B1 | 7/2001 | Greatline et al. | |
| 6,336,051 B1 | 1/2002 | Pangels et al. | |
| 6,349,775 B1 | 2/2002 | Lely et al. | |
| 6,393,927 B1 | 5/2002 | Biggs et al. | |
| 6,516,271 B2 | 2/2003 | Upadhyaya et al. | |
| 6,553,299 B1 | 4/2003 | Keller et al. | |
| 6,553,312 B2 | 4/2003 | Upadhyaya et al. | |
| D476,340 S | 6/2003 | Niebuhr et al. | |
| 6,671,582 B1 | 12/2003 | Hanley | |
| 6,686,951 B1 | 2/2004 | Dickson et al. | |
| 6,703,973 B1 | 3/2004 | Nichols | |
| D488,487 S | 4/2004 | Isayama et al. | |
| 6,745,128 B2 | 6/2004 | Hanson | |
| 6,750,898 B1 | 6/2004 | Ishida et al. | |
| 6,762,714 B2 | 7/2004 | Cohen et al. | |
| 6,792,882 B2 | 9/2004 | Aspelin et al. | |
| 6,889,620 B2 | 5/2005 | Fraisse et al. | |
| 6,915,197 B2 | 7/2005 | Lely | |
| 6,990,459 B2 | 1/2006 | Schneider | |
| 7,103,451 B2 | 9/2006 | Seal et al. | |
| 7,171,912 B2 | 2/2007 | Fraisse et al. | |
| 7,184,859 B2 | 2/2007 | Hood et al. | |
| 7,188,029 B1 | 3/2007 | Biddick | |
| 7,248,968 B2 | 7/2007 | Reid | |
| 7,343,867 B2 | 3/2008 | Fraisse et al. | |
| 7,363,154 B2 | 4/2008 | Lindores | |
| 7,421,338 B2 | 9/2008 | Kim et al. | |
| 7,597,055 B2 | 10/2009 | Choulet | |
| 7,669,675 B2 | 3/2010 | Hagie | |
| 7,723,660 B2 | 5/2010 | Holland | |
| 7,725,233 B2 | 5/2010 | Hendrickson et al. | |
| 7,735,436 B2 | 6/2010 | Modaresi | |
| 7,765,780 B2 | 8/2010 | Koselka et al. | |
| 7,792,622 B2 | 9/2010 | Wei et al. | |
| 7,857,237 B2 | 12/2010 | Vickers et al. | |
| 7,898,470 B2 | 3/2011 | Heraud et al. | |
| 7,957,850 B2 | 6/2011 | Anderson | |
| 8,028,470 B2 | 10/2011 | Anderson | |
| 8,121,345 B2 | 2/2012 | Jochem et al. | |
| 8,150,554 B2 | 4/2012 | Anderson | |
| 8,180,514 B2 | 5/2012 | Kaprielian et al. | |
| 8,186,449 B2 | 5/2012 | Hackert et al. | |
| 8,208,680 B2 | 6/2012 | Scharf et al. | |
| 8,234,010 B2 | 7/2012 | Thompson et al. | |
| 8,683,742 B1 | 4/2014 | Cox | |
| 8,712,144 B2 | 4/2014 | Mas et al. | |
| 8,744,626 B2 | 6/2014 | Johnson et al. | |
| 8,755,976 B2 | 6/2014 | Peters et al. | |
| 8,763,713 B2 * | 7/2014 | Bassett | A01C 5/06 |
| | | | 111/135 |
| 8,849,523 B1 | 9/2014 | Chan et al. | |
| 2003/0229435 A1 | 12/2003 | Van Der Lely | |
| 2005/0055147 A1 | 3/2005 | Hrazdera et al. | |
| 2005/0126144 A1 | 6/2005 | Koselka et al. | |
| 2008/0027599 A1 | 1/2008 | Logan et al. | |
| 2008/0046130 A1 | 2/2008 | Faivre et al. | |
| 2009/0157259 A1 | 6/2009 | Han et al. | |
| 2010/0250199 A1 | 9/2010 | Breedlove | |
| 2011/0017111 A1 | 1/2011 | Paton et al. | |
| 2011/0084851 A1 | 4/2011 | Peterson et al. | |
| 2012/0101861 A1 | 4/2012 | Lindores | |
| 2012/0143429 A1 | 6/2012 | Anderson | |
| 2013/0289817 A1 | 10/2013 | Kellum | |
| 2013/0325242 A1 | 12/2013 | Cavender-Bares et al. | |
| 2014/0379228 A1 * | 12/2014 | Batcheller | A01C 21/005 |
| | | | 701/50 |

FOREIGN PATENT DOCUMENTS

| | | |
|---|---|---|
| EP | 2286653 | 4/2013 |
| JP | 2004008186 | 1/2004 |
| JP | 2010161980 | 7/2010 |
| WO | WO2009141465 | 11/2009 |

OTHER PUBLICATIONS

Alan Hagie | LinkedIn. 2012. Accessed Jan. 6, 2015 http://www.linkedin.com/pub/alan-hagie/10/838/b54.

An/(deere$) and Robot$ in AppFT Database. 2012. Accessed Jan. 6, 2015 http://appft1.uspto.gov/netacgi/nph-Parser?Sect1=PTO2&Sect2=HITOFF&u=%2Fnetahtml%2FPTO%2Fsearch-adv.html&r=0&f=S&1=50&d=PG01&OS=an%2F%28deere%24%29+and+robot%24&RS=AN%2Fdeere%24&PrevList1=Prev.+50+Hits&TD=702&Srch1=deere%24.AS.&StartNum=&Query=an%2F%28deere%24%29+and+robot%24.

An/(deere$) and Robot$ in US Patent Collection. 2012. Accessed Jan. 6, 2015 http://patft.uspto.gov/netacgi/nph-Parser?Sect1=PTO2&Sect2=HITOFF&u=%2Fnetahtml%2FPTO%2Fsearch-adv.htm&r=0&f=S&1=50&d=PTXT&RS=AN%2Fdeere%24&Refine=Refine+Search&Refine=Refine+Search&Query=an%2F%28deere%24%29+and+robot%24.

Ants Are the Tractor of the Future. 2011. Wired. Accessed Jan. 6, 2015 http://www.wired.com/autopia/2011/02/ants-are-the-tractor-of-the-future/?utm_source=Contextly&utm_medium=RelatedLinks&utm_campaign=Previous.

Application of High Resolution Images from Unmanned Aerial Vehicles for Hydrology and Range Science. 2012. Accessed Jan. 6, 2015 http://www.spcru.ars.usda.gov/research/publications/publications.htm?seq_no_115=286359.

Armadillo Scout Arrived at Hohenheim: Mess—Und Prüftechnik. 2012. Accessed Jan. 6, 2015. https://mpt.uni-hohenheim.de/en/news/armadillo-angekommen-in-hohenheim-universitaet.

Arthur F. Lange—Google Search. Accessed Jan. 6, 2015. https://www.google.com/search?tbo=p&tbm=pts&hl=en&q=ininventor:%22Arthur+F.+Lange%22#q=ininventor:%22Arthur30 F.+Lange%22&hl=en&tbm=pts&ei=qcn1T4HjNPPE2QXvkNXvBg&start=0&sa=N&bav=on.2,or.r_gc.r_pw.r_qf.,cf.osb&fp=8221066f0ffb4009&biw=1308&bih=680.

Autonomous Solutions, Inc. | Vehicle Automation | Robotic Software | Multi-vehicle Command and Control. Accessed Jan. 7, 2015. www.asirobots.com.

Autonomous Tractor is Outstanding in its Field. 2011, Wired. Accessed Jan. 6, 2015. http://www.wired.com/autopia/2011/09/autonomous-tractor-is-outstanding-in-its-field/.

Blue River Technology—Home. Accessed Jan. 6, 2015. http://bluerivert.com/.

(56) References Cited

OTHER PUBLICATIONS

Brown, Mark. Sep. 20, 2011. "Autonomous Self-steering Tractor Gets About with GPS (Wired UK)." http://www.wired.co.uk/news/archive/2011-09/20/robotic-tractor.

Bryan Aivazian | LinkedIn. Accessed Jan. 6, 2015 http://www.linkedin.com/pub/bryan-aivazian/19/168/9b2.

Waugh, But Where's the Farmer: Robot Tractor Can Plant and Harvest All on its Own—Even at Night | Mail Online. Sep. 26, 2011 http://www.dailymail.co.uk/sciencetech/article-2041999/But-wheres-farmer-Robot-tractor-plant-harvest--night.html.

Class Schedule for Communications: Directive Radio Wave Systems and Devices (E.G., Radar, Radio Navigation). Accessed Jan. 6, 2015 http://www.uspto.gov/web/patents/classification/uspc342/sched342.htm#C342S357520.

Could Robot Tractors Revolutionize Agriculture? Sep. 20, 2011 http://www.world-science.net/othernews/110920_tractor Courtesy of Catholic University of Leuven and World Science Staff.

Distributed Robotic Guidance. Keegan et al. http://appft1.uspto.gov/netacgi/nph-Parser?Sect1=PTO2&Sect2=HITOFF&u=%2Fnetahtml%2FPTO%2Fsearch-adv.html&r=2&f=G&l=50&d=PG01&s1=deere$.AS.&p=1&OS=an/(deere$)+and+robot$&RS=AN/deere$.

Tonneson, Driverless Tractor May Debut in Valley—Farm Progress. May 1, 2012 http://farmprogress.com/blogs-driverless-tractor-may-debut-valley-3213.

Field Robot Website [fieldrobot.dk], Accessed Jan. 6, 2015 http://www.fieldrobot.dk/pages/armadillo.php now www.frobomind.org.

Full Title.Accessed Jan. 6, 2015. http://www.uspto.gov/web/patents/classification/shadowFiles/defs180sf.htm?180_401&S&BF&BG#BG.

Full Title. Accessed Jan. 6, 2015. http://www.uspto.gov/web/patents/classification/shadowFiles/defs340sf.htm?340_990&S&4P&4Q&4R#4R.

Full Title. Accessed Jan. 6, 2015. http://www.uspto.gov/web/patents/classification/shadowFiles/defs340sf.htm?340_995.12&S&4P&4W&4Y#4Y.

Full Title. Accessed Jan. 6, 2015. http://www.uspto.gov/web/patents/classification/shadowFiles/defs700sf.htm?700_207&S&2I&2N&39&5R#5R.

GreenSeeker Chlorophyll Sensors Perform Variable Rate Fertilizing of Wheat and Corn Crops. Accessed Jan. 6, 2015. http://www.ntechindustries.com/greenseeker-home.html.

Hagie Manufacturing Company—Leader in High Clearance, Self-Propelled Agricultural Sprayers. Accessed Jan. 6, 2015 http://www.hagie.com/.

Harvest Automation—Tough, Smart Simple Robots. Accessed Jan. 6, 2015 http://www.harvestai.com/.

Illinois Agronomy Handbook. Accessed Jan. 6, 2015. http://extension.cropsci.illinois.edu/handbook/.

Illinois Agronomy Handbook, 1999-2000. http://www.archive.org/stream/illinoisagronomy1360univ#page/96/mode/2up.

Innovation in Planters and Grain Carts : Kinze Manufacturing. Accessed Jan. 6, 2015. http://www.kinze.com/.

iRobot Corporation: Robots That Make a Difference. Accessed Jan. 6, 2015. http://www.irobot.com/us/.

Jensen, ISPA | A Low Cost, Modular Robotics Tool Carrier for Precision Agriculture Research Jul. 20-23, 2014 https://www.ispag.org/presentation/1/1221/.

Jaybridge Robotics. Accessed Jan. 6, 2015 http://www.jaybridge.com/.

John Deere AutoTrac RowSense Guidance Systems Agricultural Management Solutions (AMS). Accessed Jan. 7, 2015 http://www.deere.com/wps/dcom/en_INT/products/equipment/agricultural_management_solutions/guidance_systems/autotrac_rowsense/autotrac_rowsense.page.

John Deere Products & Services. Accessed Jan. 5, 2015. http://www.deere.com/en_US/regional_home.page.

John Deere Tango E5 Autonomous Mower. Accessed Jan. 6, 2015 http://www.deere.com/wps/dcom/en_INT/products/equipment/autonomous_mower/tango_e5/tango_e5.page.

Jorge Heraud | LinkedIn. Accessed Jan. 6, 2015 http://www.linkedin.com/pub/jorge-heraud/5/b94/704.

Lamm, F.R., and A.J. Schlegel. 2000. "Nitrogen Fertigation for Corn Using SDI : A BMP." Nitrogen Fertilization for corn production when using LEPA center Pivot Sprinklers. Accessed Jan. 7, 2015 http://www.ksre.ksu.edu/pr_irrigate/Reports/LF61900v.htm.

Lee Redden | LinkedIn. Accessed Jan. 6, 2015 http://www.linkedin.com/pub/lee-redden/25/225/925.

Media, mumbo jumbo."BoniRob field robot measures maize plants." Accessed Jan. 7, 2015. http://go awayamazone.de/index.php?lang=1&news=26.

Miller Self Propelled Sprayers—Home. Accessed Jan. 6, 2015 http://www.millerstn.com/.

New John Deere Strategy Takes Intelligent Farming to the Next Level. Nov. 13, 2011. http://www.deere.com/wps/dcom/en_INT/our_company/news_and_media/press_releases/2011/nov/farm_sight.page.

Kinze Manufacturing Unveils First Autonomous Row Crop Technology. Kinze Manufacturing. Jul. 29, 2011. Williamsburg, IA.

Autoprobe. Accessed Jan. 7, 2015. www.argobotics.com.

Maruyama Mfg. Co., Inc. Homepage Accessed on Jan. 7, 2015 http://www.maruyama.co.jp/english/index.html.

Noel Wayne Anderson—Google Search. Accessed Jan. 6, 2015 https://www.google.com/search?tbo=p&tbm=pts&hl=en&q=ininventor:%22Noel+Wayne+Anderson%22.

Pocock, John. Jan. 1, 2006. "Robot Farming, Really? | Content from Corn and Soybean Digest." http://cornandsoybeandigest.com/robot-farming-really.

Deer and Company, Published May 1, 2012Powered Mobile Module and Attachment Combination . . . http://www.google.com/patents?id=_eQNAgAAEBAJ&printsec=frontcover&dq=8,167,053&hl=en&sa=X&ei=o8_gT8K5J4j68gSbndiVDQ&ved=0CDUQ6AEwAA.

Precision and Fertiliz$ and Farm$ and Robot$ Andnot Cancer Andnot Particl$ in US Patent Collection Accessed Jan. 6, 2015 http://patft.uspto.gov/netacgi/nph-Parser?Sect1=PTO2&Sect2=HITOFF&u=%2Fnetahtml%2FPTO%2Fsearch-adv.htm&r=0&f=S&l=50&d=PTXT&RS=%28%28%28%28precision+AND+fertiliz%24%29+AND+farm%24%29+ANDNOT+cancer%29+ANDNOT+particl%24%29&Refine=Refine+Search&Refine=Refine+Search&Query=precision+and+fertiliz%24+and+farm%24+and+robot%24+andnot+cancer+andnot+particl%24.

Roesler et al., Robot Tractor Will Make Debut in September in N.D., Mar. 5, 2012. *Tri State Neighbor*. Accessed Jul. 6. http://www.tristateneighbor.com/news/agri-tech/article_c61b01be-670f-11e1-a348-0019bb2963f4.html.

Rocona, Inc. 2012, Accessed Jan. 6, 2015. http://www.rocona.com/.

Self-steering Automated Tractor Offers More Precision in the Field—KU Leuven. 2011. http://www.kuleuven.be/english/news/tractor.

Sidedress in US Patent Collection. Accessed Jan. 6, 2015 http://patft.uspto.gov/netacgi/nph-Parser?Sect1=PTO2&Sect2=HITOFF&u=%2Fnetahtml%2FPTO%2Fsearch-adv.htm&r=0&p=1&f=S&l=50&Query=sidedress&d=PTXT.

Sidedress$ in US Patent Collection, Accessed Jan. 7, 2015. http://patft.uspto.gov/netacgi/nph-Parser?Sect1=PTO2&Sect2=HITOFF&u=%2Fnetahtml%2FPTO%2Fsearch-adv.htm&r=0&p=1&f=S&l=50&Query=sidedress%24&d=PTXT.

Solum, Inc. Accessed Jan. 6, 2015 http://solum.ag/.

Smalley, These May Be the Droids Farmers Are Looking for. Nov. 11, 2011 http://www.wired.com/business/2011/11/mobile-farm-robots/.

Trimble—Agriculture—Flow & Application Control—Planting. Accessed Jan. 7, 2015. www.trimble.com.

Ttl/(agricultur$ and Robot) or Abst/(agricultur$ and Robot) in US Patent Collection. Accessed Jan. 6, 2015, http://patft.uspto.gov/netacgi/nph-Parser?Sect1=PTO2&Sect2=HITOFF&p=1&u=%2Fnetahtml%2FPTO%2Fsearch-adv.htm&r=0&f=S&l=50&d=PTXT&Query=ttl%2F%28agricultur%24+and+robot%29+or+abst%2F%28agricultur%24+and+robot%29.

Ttl/(farm$ and Robot$) or Abst/(farm$ and Robot$) in US Patent Collection. 2012. Accessed Jan. 6, 2015 http://patft.uspto.gov/netacgi/nph-Parser?Sect1=PTO2&Sect2=HITOFF&u=%

(56) References Cited

OTHER PUBLICATIONS

2Fnetahtml%2FPTO%2Fsearch-adv.htm&r=0&p=1&f=S&l=50 &Query=ttl%2F%28farm%24+and+robot%24%29+or+abst%2F% 28farm%24+and+robot%24%29&d=PTXT.

Ttl/(fertil$ and Corn) or Abst/(fertil$ and Corn) in US Patent Collection. Accessed Jan. 6, 2015. http://patft.uspto.gov/netacgi/nph-Parser?Sect1=PTO2&Sect2=HITOFF&u=%2Fnetahtml%2FPTO% 2Fsearch-adv.htm&r=0&f=S&l=50&d=PTXT&RS=%28TTL% 2F%28farm%24+AND+robot%24%29+OR+ABST%2F% 28farm%24+AND+robot%24%29%29&Refine=Refine+Search &Refine=Refine+Search&Query=ttl%2F%28fertil%24+and+ corn%29+or+abst%2F%28fertil%24+and+corn%29.

Ttl/(fertil$ and Robot) or Abst/(fertil$ and Robot) in US Patents Text Collection. Accessed Jan. 6, 2015. http://patft.uspto.gov/netacgi/ nph-Parser?Sect1=PTO2&Sect2=HITOFF&u=%2Fnetahtml% 2FPTO%2Fsearch-adv.htm&r=0&f=S&l=50&d=PTXT&RS=% 28TTL%2F%28fertil%24+AND+corn%29+OR+ABST%2F% 28fertil%24+AND+corn%29%29&Refine=Refine+Search &Refine=Refine+Search&Query=ttl%2F%28fertil%24+and+ robot%29+or+abst%2F%28fertil%24+and+robot%29.

Ttl/(robot$ and Agricultur$) in US Patent Collection. 2012. Accessed Jun. 19, http://patft.uspto.gov/netacgi/nph-Parser?Sect1=PTO2 &Sect2=HITOFF&u=%2Fnetahtml%2FPTO%2Fsearch-adv.htm &r=0&p=1&f=S&l=50 &Query=ttl%2F%28robot%24+and+agricultur%24%29&d=PTXT.

Robocrop Vision Guidance, http://thtechnology.co.uk/Robocrop. html Aug. 10, 2013.

John Deere http://www.deere.com/en_IN/home_page/ag_home/ products/technology/technology.html Dec. 6, 2013.

*Jaybridge Robotics: Kinze Autonomous Grain Cart Case Study.* 2011. http://www.youtube.com/watch?v=MhA5aIw7xNk &feature=youtube_gdata_player. Transcription.

*Jaybridge Robotics: Kinze Autonomous Grain Cart System Technical Tour.* 2011. http://www.youtube.com/watch?v=k0Lj_5MBu8w &feature=youtube_gdata_player. Transcription.

*Kinze Autonomy Project Unveiled.* 2011. http://www.youtube.com/ watch?v=pocvkqlcyog&feature=youtube_gdata_player. Transcription.

Benson, Eric, *The Good, the Bad and the Ugly: Advanced Technology in Agriculture.* Delaware Experimental Station, Department of Bioresources Engineering, College of Agriculture and Natural Resources, University of Delaware. Prior to Jan. 6, 2015.

Codo, Jean-Marie, M Poncelet, A Monin, and M Devy. 2011. *Safety Robotic Lawnmower with Precise and Low-cost L1-only RTK-GPS Positioning.*

D.W., Franzen. *Nitrogen Extenders and Additives*, NDSU Extension. Prior to Jan. 6, 2015.

Dinnes, D, D Jaynes, et al. *Plant-Soil-Microbe N Relationships in High Residue Management Systems*. USDA-ARS National Soil Tilth Laboratory. Prior to Jan. 6, 2015.

Ebelhar, SA. *Evaluation of New Nitrogen Fertilizer Technologies for Corn.* Prior to Jan. 6, 2015.

Mengel, David B. *Managing Nutrients in No-till: Surface Application of N and P.* Department of Agronomy Kansas State University, Prior to Jan. 6, 2015.

Rizos, Chris, and Shaowel Han. 1998. *Status and Trends for High Precision GPS Kinematic Positioning.*

Lohr, Steve. 2011. "Lean Start-Ups Reach Beyond Silicon Valley's Turf" *The New York Times*, Dec. 5, 2011 sec. Science. http://www. nytimes.com/2011/12/06/science/lean-start-ups-reach-beyond-silicon-valleys-turf.html.

Arvidsson et al., Rubber Track Systems for Conventional Tractor—Effects on soil compaction and traction. 2011, Soil & Tillage Research. Elsevier.

Åstrand et al., "An Agricultural Mobile Robot with Vision-Based Perception for Mechanical Weed Control", Autonomous Robots 13, 20-35 (2002). HalmstadUniversity.

Baerveldt, "Guest Editorial: Agricultural Robotics", Automous Robots 13, 5-7 (2002). Halmstad University.

Baker et al., "A Point-Injector Applicator to Improve Fertilizer Management" 1989. Applied Engineering Agriculture pp. 334-338.

Bakhsh et al., "N-Applicastion Methods and Precipitation Pattern Effects on Subsurface Drainage Nitrate Losses and Crop Yields", Water Air Soil Pollut (2010) 212:65-76.

Bierman et al., "Survey of Nitrogen Fertilizer use on corn in Minnesota", Agricultural Systems 109 (2012) 43-52. Elsevier.

Bivin et al., "Mechanics of Dynamic Penetration into Soil Medium", Mechanics of Solids. Dec. 2010, vol. 45, Issue 6. Abstract.

Boguslavskii et al., "Theory and Practice of Projectile's Penetration in Soils", Journal of Geotechnical Engineering. Oct. 1996.

Bremner, "Recent research on problems in the use of urea as a nitrogen fertilizer", Fertilizer Research 42:321-329 (1995). Department of Agronomy.

Cariou et al., "Automatic Guidance of a Four-Wheel-Steering Mobile Robot", Journal of Field Robotics 26(6-7), 2009.

Cassel et al., "Tillage Effects on Corn Production and Soil Physical Conditions", Soil Science Society of America Journal. 59:1436-1443. (1995).

Cassman, Kenneth G., Achim Dobermann, and Daniel T. Walters. 2002. "Agroecosystems, Nitrogen-Use Efficiency, and Nitrogen Management." *Ambio* 31 (2) (Mar. 1): 132-140. doi:10.2307/ 4315226.

Chen, Guihua, and Ray R. Weil. 2011, "Root Growth and Yield of Maize as Affected by Soil Compaction and Cover Crops." *Soil and Tillage Research* 117 (0) (December): 17-27. doi:10.1016/j.still. 2011.08.001.

Cordill, C., and T.E. Grift, 2011. "Design and Testing of an Intra-row Mechanical Weeding Machine for Corn." *Biosystems Engineering* 110 (3) (November): 247-252. doi:10.1016/j.biosystemseng.2011. 07.007.

Davis, Adam S., Jason D. Hill, Craig A. Chase, Ann M. Johanns, and Matt Liebman. 2012. "Increasing Cropping System Diversity Balances Productivity, Profitability and Environmental Health." *PLoS One* 7 (10) (Oct. 10): e47149. doi:10.1371/journal.pone.0047149.

Dawar, K., M. Zaman, J.S. Rowarth, J. Blennerhassett, and M.H. Turnbull. 2011. "Urease Inhibitor Reduces N Losses and Improves Plant-bioavailability of Urea Applied in Fine Particle and Granular Forms Under Field Conditions." *Agriculture, Ecosystems & Environment* 144 (1) (November): 41-50. doi:10.1016/j.agee.2011.08.007.

Dong, Fuhong, Wolfgang Heinemann, and Roland Kasper. 2011. "Development of a Row Guidance System for an Autonomous Robot for White Asparagus Harvesting." *Computers and Electronics in Agriculture* 79 (2) (November): 216-225. doi:10.1016/j.compag. 2011.10.002.

Donovan, G.T. 2012. "Position Error Correction for an Autonomous Underwater Vehicle Inertial Navigation System (INS) Using a Particle Filter." *IEEE Journal of Oceanic Engineering* 37 (3) (July): 431-445. doi:10.1109/JOE.2012.2190810.

Doran, John W. 1980. "Soil Microbial and Biochemical Changes Associated with Reduced Tillage." *Soil Science Society of America Journal* 44 (4): 765-771. doi:10.2136/sssaj1980. 03615995004400040022x.

Engel, R., C. Jones, and R. Wallander. 2011. "Ammonia Volatilization from Urea and Mitigation by NBPT Following Surface Application to Cold Soils." *Soil Science Society of America Journal* 75 (6): 2348. doi:10.2136/sssaj2011.0229.

van Es, H.M., C.P. Gomes, M. Sellmann, and C.L. van Es. 2007. "Spatially-Balanced Complete Block Designs for Field Experiments." *Geoderma* 140 (4) (Aug. 15): 346-352. doi:10:1016/j. geoderma.2007.04.017.

Es, Van, H. M, Van Es, and C. L. 1993. "Spatial Nature of Randomization and its Effect on the Outcome of Field Experiments." *Agronomy Journal* 85 (2): 420-428. doi:10.2134/agronj1993. 00021962008500020046x.

Fox, R. H., J. M. Kern, and W. P. Piekielek, 1986. "Nitrogen Fertilizer Source, and Method and Time of Application Effects on No-till Corn Yields and Nitrogen Uptakes." *Agronomy Journal* 78 (4): 741-746. doi:10.2134/agronj1986.00021962007800040036x.

Gagnon, Bernard, and Noura Ziadi. 2010. "Grain Corn and Soil Nitrogen Responses to Sidedress Nitrogen Sources and Applications." *Agronomy Journal* 102 (3): 1014. doi:10.2134/agronj2010. 0011.

(56) References Cited

OTHER PUBLICATIONS

Gagnon, Bernard, Noura Ziadi, and Cynthia Grant. 2012. "Urea Fertilizer Forms Affect Grain Corn Yield and Nitrogen Use Efficiency." *Canadian Journal of Soil Science* 92 (2) (February): 341-351. doi:10.4141/cjss2011-074.
Gavric, M., M. Martinov, S. Bojic, Dj. Djatkov, and M. Pavlovic. 2011. "Short- and Long-term Dynamic Accuracies Determination of Satellite-based Positioning Devices Using a Specially Designed Testing Facility." *Computers and Electronics in Agriculture* 76 (2) (May): 297-305. doi:10.1016/j.compag.2011.02.008.
Gee, Christelle, 2008. "Detecting Crops and Weeds in Precision Agriculture." *SPIE Newsroom*. doi:10.1117/2.1200809.1226. http://spie.org/X27354.xml.
Halvorson, Ardell D., and Stephen J. Del Grosso. 2012. "Nitrogen Source and Placement Effects on Soil Nitrous Oxide Emissions from No-Till Corn." *Journal Of Environment Quality* 41 (5): 1349. doi:10.2134/jeq2012.0129.
Harrigan, Tim, S Snapp, R Leep, D Mutch, and N Rector. 2007. "Manure Slurry-Enriched Seeding of Cover Crops." *Resource* (February).
Hendrickson, L.L., and E.A. Douglass. 1993. "Metabolism of the Urease Inhibitor N-(n-butyl)thiophosphoric Triamide (nbpt) in Soils." *Soil Biology and Biochemistry* 25 (11) (November): 1613-1618. doi:10.1016/0038-0717(93)90017-6.
Hernandez-Ramirez, Guillermo, Sylvie M. Brouder, Douglas R. Smith, and George E. Van Scoyoc. 2011, "Nitrogen Partitioning and Utilization in Corn Cropping Systems: Rotation, N Source, and N Timing." *European Journal of Agronomy* 34 (3) (April): 190-195. doi:10.1016/j.eja.2010.12.002.
Herrick, J.E. 2005. "Response to 'Comments on "Simultaneous Measurement of Soil Penetration Resistance and Water Content with a Combined Penetrometer—TDR Moisture Probe" and "A Dynamic Cone Penetrometer for Measuring Soil Penetration Resistance."'" *Soil Science Society of America Journal* 69 (3): 926. doi:10.2136/sssaj2005.0926.
Herrick, Jeffrey E., and Tim L. Jones. 2002, "A Dynamic Cone Penetrometer for Measuring Soil Penetration Resistance." *Soil Science Society of America Journal* 66 (4): 1320. doi:10.2136/sssaj2002.1320.
Howard, Donald D., and Michael E. Essington, 1998. "Effects of Surface-Applied Limestone on the Efficiency of Urea-Containing Nitrogen Sources for No-Till Corn." *Agronomy Journal* 90 (4): 523-528. doi:10.2134/agronj1998.00021962009000040014x.
Iida, Michihisa, Donghyeon Kang, Mitsuru Taniwaki, Mutsumi Tanaka, and Mikio Umeda. 2008. "Localization of CO2 Source by a Hexapod Robot Equipped with an Anemoscope and a Gas Sensor." *Computers and Electronics in Agriculture* 63 (1) (August): 73-80. doi:10.1016/j.compag.2008.01.016.
Karlen, D.L., E.C. Berry, T.S. Colvin, and R. S. Kanwar. 1991. "Twelve year Tillage and Crop Rotation Effects on Yields and Soil Chemical Properties in Northeast Iowa 1." *Communications in Soil Science and Plant Analysis* 22 (19-20): 1985-2003. doi:10.1080/00103629109368552.
Kitur, B. K., M. S. Smith, R. L. Blevins, and W. W. Frye. 1984. "Fate of 15N-Depleted Ammonium Nitrate Applied to No-Tillage and Conventional Tillage Corn." *Agronomy Journal* 76 (2): 240-242. doi:10.2134/agronj1984.00021962007600020016x.
Kyveryga, P. M., and T. M. Blackmer. 2012a. "On-Farm Evaluations to Calibrate Tools for Estimating Late-Season Nitrogen Status of Corn." *Agronomy Journal* 104 (5): 1284. doi:10.2134/agronj2011.0403.
Lawes, R. A., and R. G. V. Bramley. 2012. "A Simple Method for the Analysis of On-Farm Strip Trials." *Agronomy Journal* 104 (2): 371. doi:10.2134/agronj2011.0155.
Lehrsch, Gary A., R. E. Sojka, and D. T. Westermann. 2000. "Nitrogen Placement, Row Spacing, and Furrow Irrigation Water Positioning Effects on Corn Yield." *Agronomy Journal* 92 (6): (Nov. 1): 1266-1275. doi:10.2134/agronj2000.9261266x.
Ma, B. L., M. Li, L. M. Dwyer, and G. Stewart. 2004. "Effect of In-season Application Methods of Fertilizer Nitrogen on Grain Yield and Nitrogen Use Efficiency in Maize." *Canadian Journal of Soil Science* 84 (2) (May): 169-176. doi:10.4141/S03-052.
Ma, B. L., T. Y. Wu, N. Tremblay, W. Deen, N. B. McLaughlin, M. J. Morrison, and G. Stewart. 2010. "On-Farm Assessment of the Amount and Timing of Nitrogen Fertilizer on Ammonia Volatilization." *Abstract*.
Mengel, D. B., D. W. Nelson, and D. M. Huber. 1982. "Placement of Nitrogen Fertilizers for No-Till and Conventional Till Corn." *Agronomy Journal* 74 (3): 515-518. doi:10.2134/agronj1982.00021962007400030026x.
Miller, Kathleen W., Michael A. Cole, and Wayne L. Banwart. 1991. "Microbial Populations in an Agronomically Managed Mollisol Treated with Simulated Acid Rain." *Journal of Environmental Quality* 20 (4): 845-849. doi:10.2134/jeq1991.00472425002000040023x.
Minasny, Budiman, and Alex B. McBratney. 2005. "Comments on 'Simultaneous Measurement of Soil Penetration Resistance and Water Content with a Combined Penetrometer—TDR Moisture Probe' and 'A Dynamic Cone Penetrometer for Measuring Soil Penetration Resistance'." *Soil Science Society of America Journal* 69 (3): 925. doi:10.2136/sssaj2005.0925.
Moita, Raquel Durana, Henrique A. Matos, Cristina Fernandes, Clemente Pedro Nunes, and Mário Jorge Pinho. 2012. "Evaluation of the Performance of a Heated Brine Spray System by Dynamic Simulation," *Computers & Chemical Engineering* 41 (0) (Jun. 11): 106-122. doi:10.1016/j.compchemeng.2012.03.007.
Nelson, Kelly A., Peter C. Scharf, William E. Stevens, and Bruce A. Burdick. 2011. "Rescue Nitrogen Applications for Corn." *Soil Science Society of America Journal* 75 (1): 143. doi:10.2136/sssaj2009.0456.
Niemoeller, Bernd, H. H. Harms, and T. Lang. 2011. "Injection of Liquids into the Soil with a High-pressure Jet." *Agricultural Engineering International: CIGR Journal* 13 (2) (Aug. 18). http://www.cigrjournal.org/index.php/Ejounral/article/view/1458.
Nye, Peter H. 1992. "Towards the Quantitative Control of Crop Production and Quality. II. The Scientific Basis for Guiding Fertilizer and Management Practice, Particularly in Poorer Countries." *Journal of Plant Nutrition* 15 (6-7): 1151-1173. doi: 10.1080/01904169209364387.
Nyord, T., H.T. Søgaard, M.N. Hansen, and L.S. Jensen. 2008. "Injection Methods to Reduce Ammonia Emission from Volatile Liquid Fertilisers Applied to Growing Crops." *Biosystems Engineering* 100 (2) (June): 235-244. doi:10.1016/j.biosystemseng.2008.01.013.
Paulson, Nicholas D., and Bruce A. Babcock. 2010. "Readdressing the Fertilizer Problem." *Journal of Agricultural and Resource Economics* 35 (3) (December): 368-384.
Pedersen, S., S. Fountas, H. Have, and B. Blackmore. 2006. "Agricultural Robots—system Analysis and Economic Feasibility." *Precision Agriculture* 7 (4): 295-308. doi:10.1007/s11119-006-9014-9.
Perez-Ruiz, M., J. Carballido, J. Agueera, and J. A. Gil. 2011. "Assessing GNSS correction signals for assisted guidance systems in agricultural vehicles." *Precision Agriculture* 12 (5) (October). Abstract.
Pérez-Ruiz, M., D.C. Slaughter, C.J. Gliever, and S.K. Upadhyaya. 2012. "Automatic GPS-based Intra-row Weed Knife Control System for Transplanted Row Crops." *Computers and Electronics in Agriculture* 80 (0) (January): 41-49. doi:10.1016/j.compag.2011.10.006.
Randall, Gyles W., Jeffrey A. Vetsch, and Jerald R. Huffman. 2003. "Corn Production on a Subsurface-Drained Mollisol as Affected by Time of Nitrogen Application and Nitrapyrin." *Agronomy Journal* 95 (5): 1213. doi:10.2134/agronj2003.1213.
Raun, William R., and Gordon V. Johnson. 1999. "Improving Nitrogen Use Efficiency for Cereal Production." *Agronomy Journal* 91 (3): 357-363. doi:10.2134/agronj1999.00021962009100030001x.
Raun, WR, JB Solie, GV Johnson, ML Stone, RW Mullen, KW Freeman, WE Thomason, and EV Lukina. 2002. "Improving Nitrogen Use Efficiency in Cereal Grain Production with Optical Sensing and Variable Rate Application." *Agronomy Journal* 94 (4) (August): 815-820.
Ressler, Daniel E., Robert Horton, Thomas C. Kaspar, and James L. Baker. 1998. "Localized Soil Management in Fertilizer Injection Zone to Reduce Nitrate Leaching." *Agronomy Journal* 90 (6): 747-752. doi:10.2134/agronj1998.00021962009000060005x.

(56) References Cited

OTHER PUBLICATIONS

Rice, Charles W., and M. Scott Smith. 1984. "Short-Term Immobilization of Fertilizer Nitrogen at the Surface of No-Till and Plowed Soils." *Soil Science Society of America Journal* 48 (2): 295-297. doi:10.2136/sssaj1984.03615995004800020013x.

Rizos, Chris. 2007. "Alternatives to Current GPS-RTK Services and Some Implications for CORS Infrastructure and Operations." *GPS Solutions* 11 (3) (July) Abstract.

Ruiz Diaz, D. A., J. A. Hawkins, J. E. Sawyer, and J. P. Lundvall. 2008. "Evaluation of In-Season Nitrogen Management Strategies for Corn Production." *Agronomy Journal* 100 (6): 1711. doi:10.2134/agronj2008.0175.

Rutto, E., J. P. Vossenkemper, J. Kelly, B. K. Chim, and W. R. Raun. 2013. "Maize Grain Yield Response to the Distance Nitrogen is Placed Away From the Row." *Experimental Agriculture* 49 (01): 3-18. doi:10.1017/S0014479712000981.

Scharf, Peter C., D. Kent Shannon, Harlan L. Palm, Kenneth A. Sudduth, Scott T. Drummond, Newell R. Kitchen, Larry J. Mueller, Victoria C. Hubbard, and Luciane F. Oliveira. 2011. "Sensor-Based Nitrogen Applications Out-Performed Producer-Chosen Rates for Corn in On-Farm Demonstrations." *Agronomy Journal* 103 (6): 1683. doi:10.2134/agronj2011.0164.

Schjonning, P., M. Lamande, T. Keller, J. Pedersen, and M. Stettler. 2012. "Rules of Thumb for Minimizing Subsoil Compaction." *Soil Use and Management* 28 (3) (Septemper): 378-393. doi:10.1111/j.1475-2743.2012.00411.x.

Schmidt, JP, AJ DeJoia, RB Ferguson, RK Taylor, RK Young, and JL Havlin. 2002. "Corn yield response to nitrogen at multiple in-field locations." *Agronomy Journal* 94 (4) (August): 798-806.

Smith, K., D. Watts, T. Way, H. Torbert, and S. Prior. 2012. "Impact of Tillage and Fertilizer Application Method on Gas Emissions in a Corn Cropping System." *Pedosphere* 22 (5) (October) Abstract.

Soares, Johnny Rodrigues, Heitor Cantarella, and Marcella Leite de Campos Menegale. 2012. "Ammonia Volatilization Losses from Surface-applied Urea with Urease and Nitrification Inhibitors." *Soil Biology and Biochemistry* 52 (0) (September): 82-89. doi:10.1016/j.soilbio.2012.04.019.

Sogbedji, J.M, H.M van Es, S.D Klausner, D.R Bouldin, and W.J Cox. 2001. "Spatial and Temporal Processes Affecting Nitrogen Availability at the Landscape Scale." *Soil and Tillage Research* 58 (3-4) (March): 233-244. doi:10.1016/S0167-1987(00)00171-9.

Stecker, J. A., D. D. Buchholz, R. G. Hanson, N. C. Wollenhaupt, and K. A. McVay. 1993. "Application Placement and Timing of Nitrogen Solution for No-Till Corn." *Agronomy Journal* 85 (3): 645-650. doi:10.2134/agronj1993.00021962008500030023x.

Sun, Y., J. Lin, D. Ma, Q. Zeng, and P. Schulze Lammers. 2007. "Measurement of Penetration Force Using a Hall-current-sensor." *Soil and Tillage Research* 92 (1-2) (January): 264-268. doi:10.1016/j.still.2006.01.002.

Tasca, Francis Alex, Paulo Roberto Ernani, Douglas Antonio Rogeri, Luciano Colpo Gatiboni, and Paulo Cézar Cassol. 2011. "Volatilização De Amônia Do Solo Após a Aplicação De Ureia Convencional Ou Com Inibidor De Urease." *Revista Brasileira De Ciência Do Solo* 35 (2) (April): 493-502. doi:10.1590/S0100-06832011000200018.

Tilman, David, Kenneth G. Cassman, Pamela A. Matson, Rosamond Naylor, and Stephen Polasky. 2002. "Agricultural Sustainability and Intensive Production Practices." *Nature* 418 (6898) (Aug. 8): 671-677. doi:10.1038/nature01014.

Townsend, Alan R., and Robert W. Howarth. 2010. "Fixing the Global Nitrogen Problem." *Scientific American* 302 (2) (Feb. 1): 64-71. doi:10.1038/scientificamerican0210-64.

Vetsch, JA, and GW Randall. 2000. "Enhancing No-tillage Systems for Corn with Starter Fertilizers, Row Cleaners, and Nitrogen Placement Methods." *Agronomy Journal* 92 (2) (April): 309-315. doi:10.1007/s100870050038.

Viswakumar, A., R. W. Mullen, A. Sundermeier, and C. E. Dygert. 2008. "Tillage and Nitrogen Application Methodology Impacts on Corn Grain Yield." *Journal of Plant Nutrition* 31 (11): 1963-1974. doi:10.1080/01904160802403102.

Walsh, Olga, William Raun, Art Klatt, and John Solie. 2012. "Effect of Delayed Nitrogen Fertilization on Maize (*Zea mays* L.) Grain Yields and Nitrogen Use Efficiency." *Journal of Plant Nutrition* 35 (4): 538-555. doi:10.1080/01904167.2012.644373.

Watson, C. J., N. A. Akhonzada, J. T. G. Hamilton, and D. I. Matthews. 2008. "Rate and Mode of Application of the Urease Inhibitor N-(n-butyl) Thiophosphoric Triamide on Ammonia Volatilization from Surface-applied Urea." *Soil Use and Management* 24 (3): 246-253. doi:10.1111/j.1475-2743.2008.00157.x.

Weiss, Ulrich, and Peter Biber. 2011. "Plant Detection and Mapping for Agricultural Robots Using a 3D LIDAR Sensor." *Robotics and Autonomous Systems* 59 (5) (May): 265-273. doi:10.1016/j.robot.2011.02.011.

Wunder, Erik, and others. 2012. "GIS- and Sensor-based Technologies for Individual Plant Agriculture." *Landtechnik* 67 (12): 37-41.

Xue, Jinlin, and Tony E. Grift. 2011. "Agricultural Robot Turning in the Headland of Corn Fields." *Applied Mechanics and Materials* 63-64: 780-784.

Xue, Jinlin, Lei Zhang, and Tony E. Grift. 2012. "Variable Field-of-view Machine Vision Based Row Guidance of an Agricultural Robot." *Computers and Electronics in Agriculture* 84 (0) (June): 85-91. doi:10.1016/j.compag.2012.02.009.

Zhou, Xiaomin, Chandra A. Madrmootoo, Angus F. MacKenzie, and Donald L. Smith. 1998. "Distribution of 15N-labeled Urea Injected into Field-grown Corn Plants." *Journal of Plant Nutrition* 21 (1): 63-73. doi:10.1080/01904169809365383.

Sainz-Costa, N, and A Ribeiro. Mapping in Wide Row Crops: Image Sequence Stabilization and Inverse Perspective Transformation. (2011).

Watson, C. 2005. "Urease Inhibitors." In Frankfurt, Germany. IFA International Workshop on Enhanced-Efficiency Fertilizers.

Edan, Yael, Shufeng Han, and Naoshi Kondo. 2009. "Automation in Agriculture." In *Springer Handbook of Automation*, ed. Shimon Y. Nof, 1095-1128. Springer Berlin Heidelberg.

Fageria, N.K., and V.C. Baligar. 2005. "Enhancing Nitrogen Use Efficiency in Crop Plants." In *Advances in Agronomy*, ed. Donald L. Sparks, vol. 88:97-185. Abstract.

Fernandez, FG, Nafziger, ED, SA Ebelhar, and Hoeft, RG. "Managing Nitrogen." In *Illinois Agronomy Handbook*. Illinois Extension. Chapter 9. (2009).

Griepentrog, Hans W., Arno Ruckelshausen, Rasmus N. Jørgensen, and Ivan Lund. 2010. "Autonomous Systems for Plant Protection." In *Precision Crop Protection—the Challenge and Use of Heterogeneity*, ed. Erich-Christian Oerke, Roland Gerhards, Gunter Menz, and Richard A. Sikora, 323-334. Springer Netherlands.

Grift, Tony E. 2007. "Robotics in Crop Production." In *Encyclopedia of Agricultural, Food and Biological Engineering*.

Harrison, Roland, and J. Webb. 2001. "A Review of the Effect of N Fertilizer Type on Gaseous Emissions." In *Advances in Agronomy*, vol. 73:65-108. Academic Press. Abstract.

Sommer, Sven G., Jan K. Schjoerring, and O.T. Denmead. 2004. "Ammonia Emission from Mineral Fertilizers and Fertilized Crops." In *Advances in Agronomy*, vol. 82:557-622. Academic Press. Abstract.

International Search Report and Written Opinion for International Application No. PCT/US2013/042479 mailing date Aug. 28, 2013.

International Preliminary Report on Patentability for International Application No. PCT/US2013/042479 mailing date Dec. 11, 2014.

International Search Report and Written Opinion for International Application No. PCT/US2014/05113 mailing date Nov. 26, 2014.

Application and File History for U.S. Appl. No. 13/837,786, filed Mar. 15, 2013, inventors Cavender-Bares et al.

International Search Report and Written Opinion for International Application No. PCT/US2014/066610 dated Mar. 30, 2015.

Application and File History for U.S. Appl. No. 14/548,421, filed Nov. 20, 2014 inventors Cavender-Bares et al.

\* cited by examiner

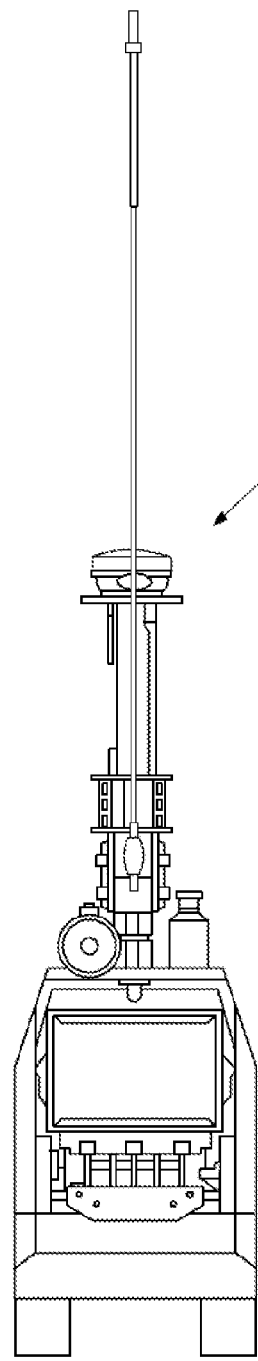 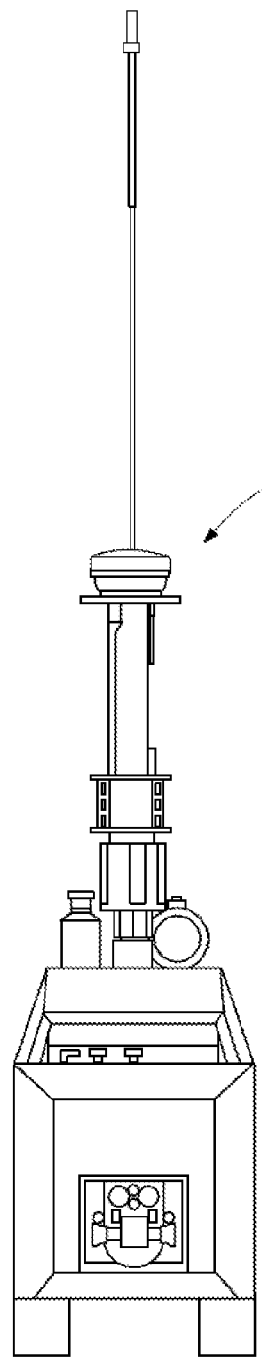
*Fig. 4*  *Fig. 5*

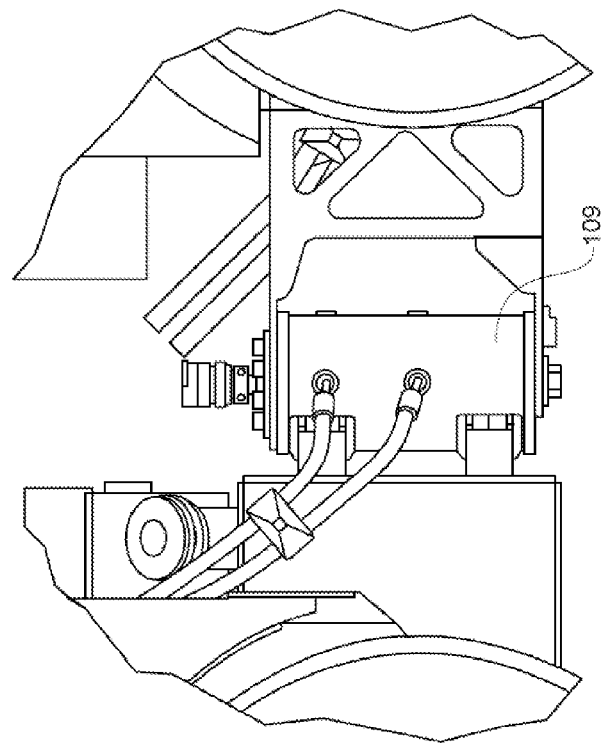
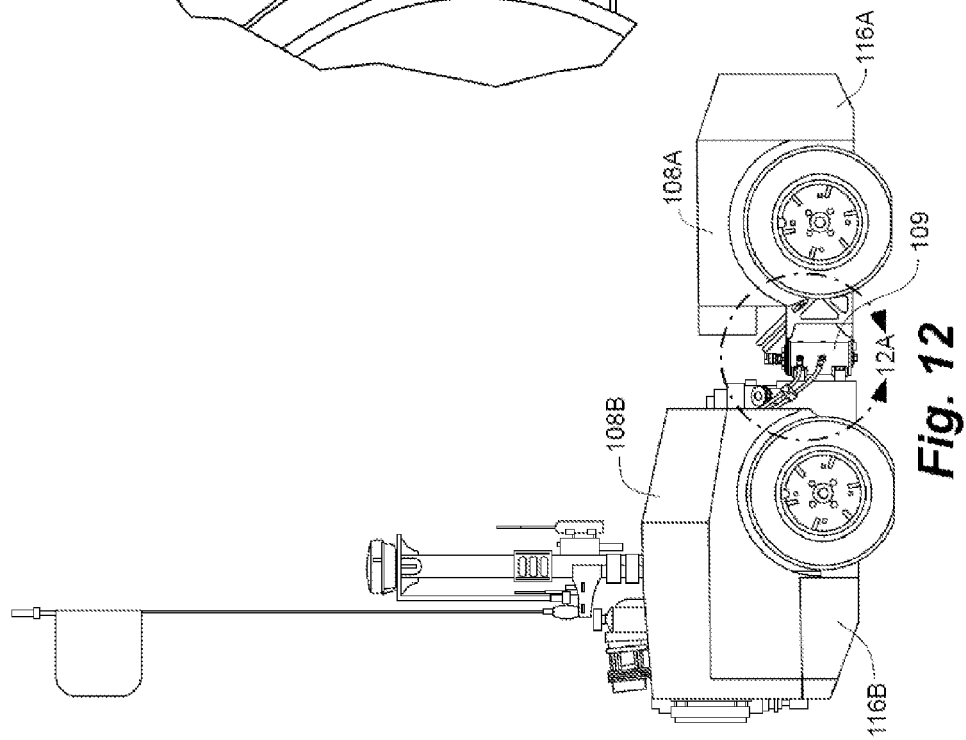

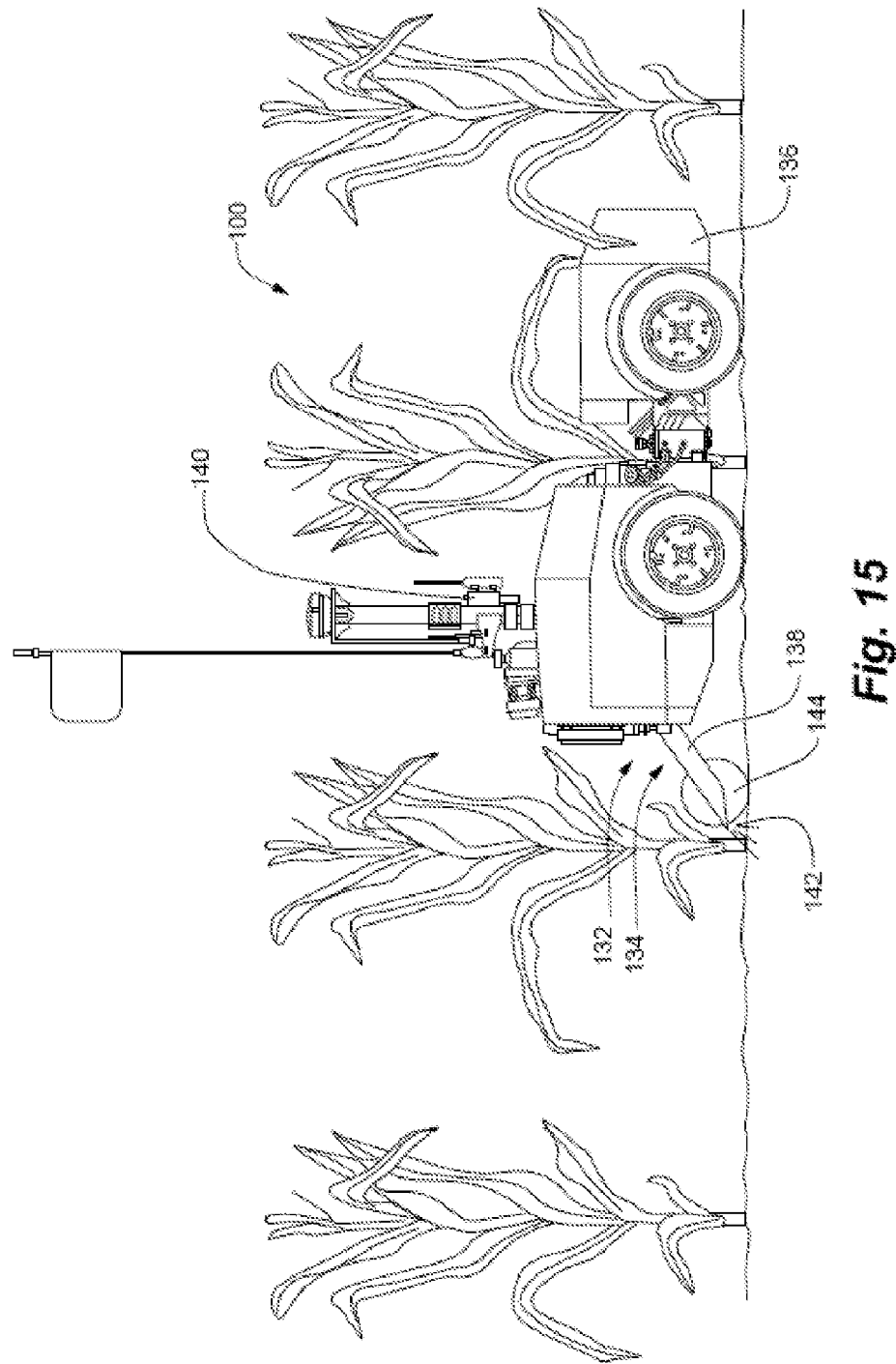

AGRICULTURAL AUTONOMOUS VEHICLE PLATFORM WITH ARTICULATED BASE

RELATED APPLICATIONS

The present application claims the benefit of U.S. Provisional Application No. 61/865,855 filed Aug. 14, 2013, which is incorporated herein in its entirety by reference.

TECHNICAL FIELD

The present invention relates generally robotic platforms for use in agriculture. More particularly, the present invention relates to an autonomous vehicle platform having an articulated base configured to perform various in-season management tasks between the planted rows of an agricultural field.

BACKGROUND OF THE INVENTION

After a growing plant exhausts the nutrient resources stored in its seed, it begins to draw in nutrients from the surrounding soil using its root system. Rapidly growing plants have a high need for nutrients. If a plant cannot access the necessary nutrients then its growth becomes limited. Such nutrient limitation can impact the overall growth of the plant, and the economic return to the farmer. Farmers use a range of strategies for increasing the availability of nutrients for a growing crop, most notably the addition of chemical fertilizers, for example nitrogen and phosphorus. However, such chemical fertilizers can be lost from the field before providing any beneficial effect.

For example, nitrogen, which is commonly introduced to a field in the form of anhydrous ammonia or urea, can be lost through gas emission to the atmosphere or through run off as water drains from the field. In particular, ammonium, which is a positively charged ion, generally binds to soil particles and is resistant to loss via runoff. However, in alkaline conditions, ammonium transforms into its gaseous form, ammonia, which can be readily lost to the atmosphere. Ammonium can also be transformed into nitrate—and subsequently lost from the field—via a microbial process known as nitrification. Nitrate, on the other hand is a negatively charged ion and dissolves readily in water and can be lost as water runs off fields into drainage ditches or streams, or as water seeps downward into groundwater.

Nitrogen fertilizer containing urea is also susceptible to loss when applied to the soil surface. Specifically, when the urea is hydrolyzed, or broken down, it releases ammonia gas, which can be readily lost to the atmosphere. However, if the urea is hydrolyzed beneath the surface within the soil profile, there is a reduced chance that the ammonia gas will be lost.

Nitrogen from the various forms of fertilizer can also be lost through a process known as denitrification, whereby nitrate is converted to gaseous forms of nitrogen, including dinitrogen and nitrous oxide. And, nitrogen can also be lost through microbial-mediated processes that create other gaseous forms of nitrogen. Warmer soil temperatures cause microbial processes to occur more rapidly, meaning that nitrogen fertilizer remaining in or on warmer soils is increasingly susceptible to this type of loss.

Phosphorus, most commonly introduced to a field in the form of phosphate, generally has a lower loss rate than nitrogen, as phosphates readily bind to soil particles. Nevertheless, phosphorus can be lost from fields through soil erosion or, less commonly, via runoff if the soil can no longer bind additional phosphate because all of the available binding sites are filled.

Fertilizer costs, which are closely tied with the cost of fossil fuels, are significant in the production of commodity crops. Fertilizer that is lost from a field represents inefficiency in agricultural production systems, as well as a potential loss in profit realized by the farmer. The substantial cost of fertilizer in the production of commodity crops incentivizes farmers to adjust the application of fertilizer to closely match the needs of what they anticipate their crop will ultimately require throughout the growing season. Yet, because fertilizer is critical in boosting production, farmers are prone to over application out of anxiety that there will be insufficient nutrients available when they are required.

Particularly in the case of nitrogen fertilizer, the longer an externally-applied fertilizer remains on an agricultural field, the more opportunities there are for the fertilizer to be lost. Thus, ideally fertilizer is applied as needed throughout the growing season. However, tractor-drawn equipment generally cannot be used throughout the entire season. For example, corn plants, require nitrogen at least until reaching the point when tassels appear, which may be at a height of six feet or more. Conventional tractor-drawn implements are incapable of applying fertilizer when corn is so tall. This has led to the use of self-propelled sprayer systems, often referred to as "high boy" or "high-clearance" systems, capable of straddling tall crops. Airplanes commonly referred to as "crop dusters," have been used to apply fertilizer throughout the growth season. But, unlike conventional tractor-drawn implements, high boy systems and crop dusters typically indiscriminately apply the fertilizer to the surface of the field.

Additionally, many farmers forego in season application, in favor of spring or fall applications, because of their anxiety about being able to get the equipment necessary to apply the fertilizer on the field within the appropriate time window for weather reasons. Farmers also contend with a range of tradeoffs when considering the timing of fertilizer applications, for example, the cost of fertilizer is often reduced in the fall as the demand for fertilizer diminishes. As a result, pre-season applications of fertilizer—either in the late fall following harvest or around the time of planting in the spring—are common. Nevertheless, both fall and spring applied fertilizer has the potential of being lost from the field due to the various processes outlined above.

Inefficient use of fertilizer often also occurs when fertilizer is uniformly applied across an entire field. Many agricultural fields are heterogeneous, with one location potentially varying year-to-year in its nutrient status and differing from locations in other parts of the field. As a result, many farmers assess soil nutrient status with periodic samples analyzed in a laboratory. These soil tests are used to estimate nutrient needs prior to the growing season, in season, or prior to an in season application of fertilizer. Because of the effort required to take these samples, they are generally infrequent and representative of a rather large area on a given field. Thus, in addition to applying fertilizer in-season when nutrients are needed, an ideal application would also take into account the specific soil conditions locally within the field.

Besides optimizing the application of fertilizer by applying it in-season as nutrients are required, and tailoring the amount to suit the localized nutrient deficiencies of the soil within a field, the planting of cover crops can help reduce nutrient loss. Cover crops are generally grown on a field between the times when a commodity crop is grown. As cover crops grow, they take up and store nutrients, essentially preventing them from being lost from the field in runoff or in other ways. Some cover crops can absorb nitrogen from the atmosphere, and can augment the amount of soil nitrogen in a field, thereby reducing the need for future applications of fertilizer. Additionally, the roots of cover crops can reduce soil compaction and reduce soil erosion. Because some time is needed for germination, the ideal time to seed a cover crop on a corn field is after maturity when the corn plants are tall and their leaves are beginning to senesce or turn brown. Seeding at this time allows sufficient light for cover crop growth to penetrate the leaf canopy, enabling substantial growth of the cover crop to occur before the onset of winter.

More recently, there has been an interest in the use of small robotic vehicles on farms. The notion of a tractor that could navigate autonomously first appeared in patent literature in the 1980s. For example, U.S. Pat. No. 4,482,960, entitled "Robotic Tractors," discloses a microcomputer based method and apparatus for automatically guiding tractors and other full sized farm machinery for the purpose of planting, tending and harvesting crops. One study in 2006 concluded that the relatively high cost of navigation systems and the relatively small payloads possible with small autonomous vehicles would make it extremely difficult to be cost effective as compared to more conventional agricultural methods. Accordingly, many of the autonomous vehicles that have been developed are as large as conventional tractors.

Despite the difficulty in maintaining cost effectiveness, a limited number of smaller agricultural robots have been developed. For example, the Maruyama Mfg. Co has developed a small autonomous vehicle capable of navigating between rows of crops. This vehicle, however, is limited to operating within a greenhouse, and is not suited for the uneven terrain typical of an agricultural field. Another example is U.S. Pat. No. 4,612,996, entitled "Robotic Agricultural System with Tractor Supported on Tracks," which discloses a robotic tractor that travels on rails forming a grid over a crop field. However, use of this system requires the installation of an elaborate and potentially expensive track system within the agricultural field. Moreover, neither system is designed to carry a large payload, nor is either system capable of making sharp turns to navigate through the rows of a planted field on the uneven terrain of an agricultural field without causing substantial damage to the crops.

Accordingly, what is needed in the industry is a device which can autonomously navigate between the planted rows on the uneven terrain of an agricultural field to accomplish in-season management tasks, such as selectively applying fertilizer or other agricultural chemicals, mapping, soil sampling, and seeding cover crops when commodity crops grow to a height where use of convention tractor-drawn equipment or high clearance machines are no longer feasible. Moreover, what is needed by the industry is a device which can carry a large payload, is narrow enough to fit through the planted rows of crops, and can make sharp turns to navigate through the rows of a planted field to prevent excessive damage to planted crops.

SUMMARY OF THE INVENTION

Embodiments of the present disclosure meet the need of the industry for a device which can autonomously navigate between the planted rows on the uneven terrain of an agricultural field while simultaneously accomplish in-season management tasks. In particular, thorough the use of an articulated base assembly, embodiments of the present disclosure can carry a large payload of fuel, fertilizer, agricultural chemical, seeds, water, or combination thereof, yet can be narrow enough to fit through the planted rows of crops, and can make sharp turns to navigate through the rows of a planted field to prevent excessive damage to planted crops.

One embodiment of the present disclosure provides an autonomous vehicle platform for selectively performing an in-season management task in an agricultural field while self-navigating between rows of planted crops. The autonomous vehicle platform includes a vehicle base. The vehicle base has a length, width and height, wherein the width is so dimensioned as to be insertable through the space between two rows of planted crops. The vehicle base includes a first portion and a second portion, wherein the first portion is pivotably coupled to the second portion, wherein each of the first portion and the second portion are operably coupled to ground engaging wheels. In one embodiment, the autonomous vehicle platform includes an in-season management task structure, a navigation module, and a microprocessor in communication with the in-season management task module and the navigation module, programmed with a self-direction program to autonomously steer the autonomous vehicle platform while performing an in-season management task.

One embodiment of the present disclosure provides an autonomous vehicle platform system for selectively performing an in-season management task in an agricultural field while self-navigating between rows of planted crops. The autonomous vehicle platform system includes one or more autonomous vehicle platforms having a length, width and height, wherein the width is so dimensioned as to be insertable through the space between two rows of planted crops with an articulated base which includes at least a first portion and a second portion, wherein the first portion is pivotably coupled to the second portion. In one embodiment, the autonomous vehicle platform system further includes one or more refilling station. In one embodiment, each autonomous vehicle platform is further programmed to compare the status of autonomous vehicle platform criteria to a programmed threshold and to navigate to the refilling station for servicing based on said comparison.

The summary above is not intended to describe each illustrated embodiment or every implementation of the present disclosure. The figures and the detailed description that follow more particularly exemplify these embodiments.

BRIEF DESCRIPTION OF THE DRAWINGS

The invention can be more completely understood in consideration of the following detailed description of various embodiments of the invention, in connection with the accompanying drawings, in which:

FIG. 4 is a rear view of the autonomous vehicle platform of FIG. 3.

FIG. 5 is a front view of the autonomous vehicle platform of FIG. 3.

FIG. 12 is a right side view of an autonomous vehicle platform with an articulate frame in accordance with an example embodiment of the invention.

FIG. 12A is a close up view of the coupling of FIG. 12.

FIG. 15 is a side view of an autonomous vehicle platform system having a fertilization structure in accordance with an example embodiment of the invention.

Figure 1:
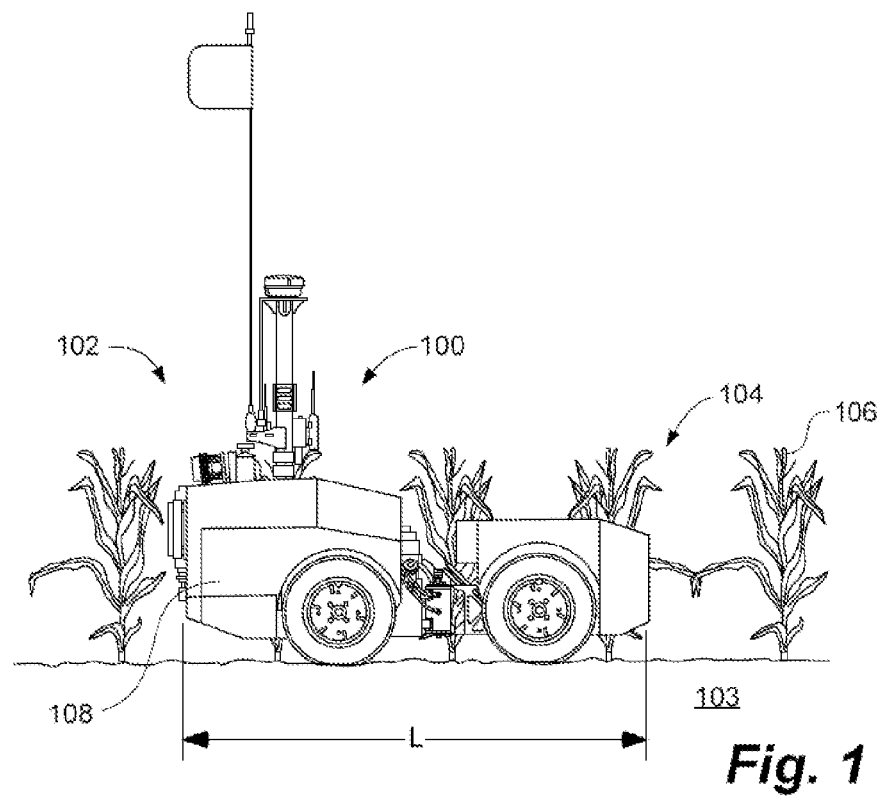
FIG. 1 is a side view of an autonomous vehicle platform in accordance with an example embodiment of the invention.

While the invention is amenable to various modifications and alternative forms, specifics thereof have by shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

Figure 2:
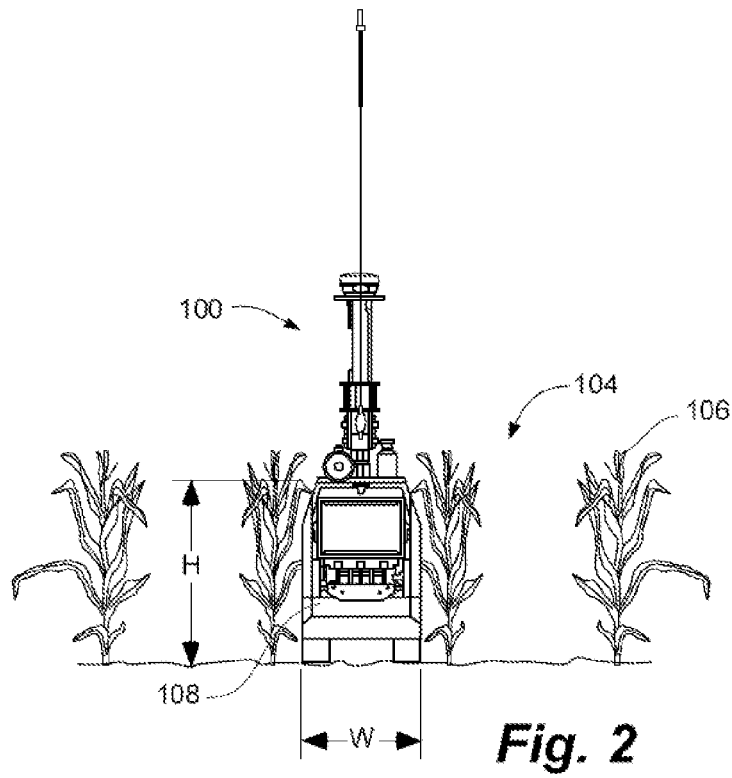
FIG. 2 is a rear view of an autonomous vehicle platform in accordance with an example embodiment of the invention.
Figure 3:
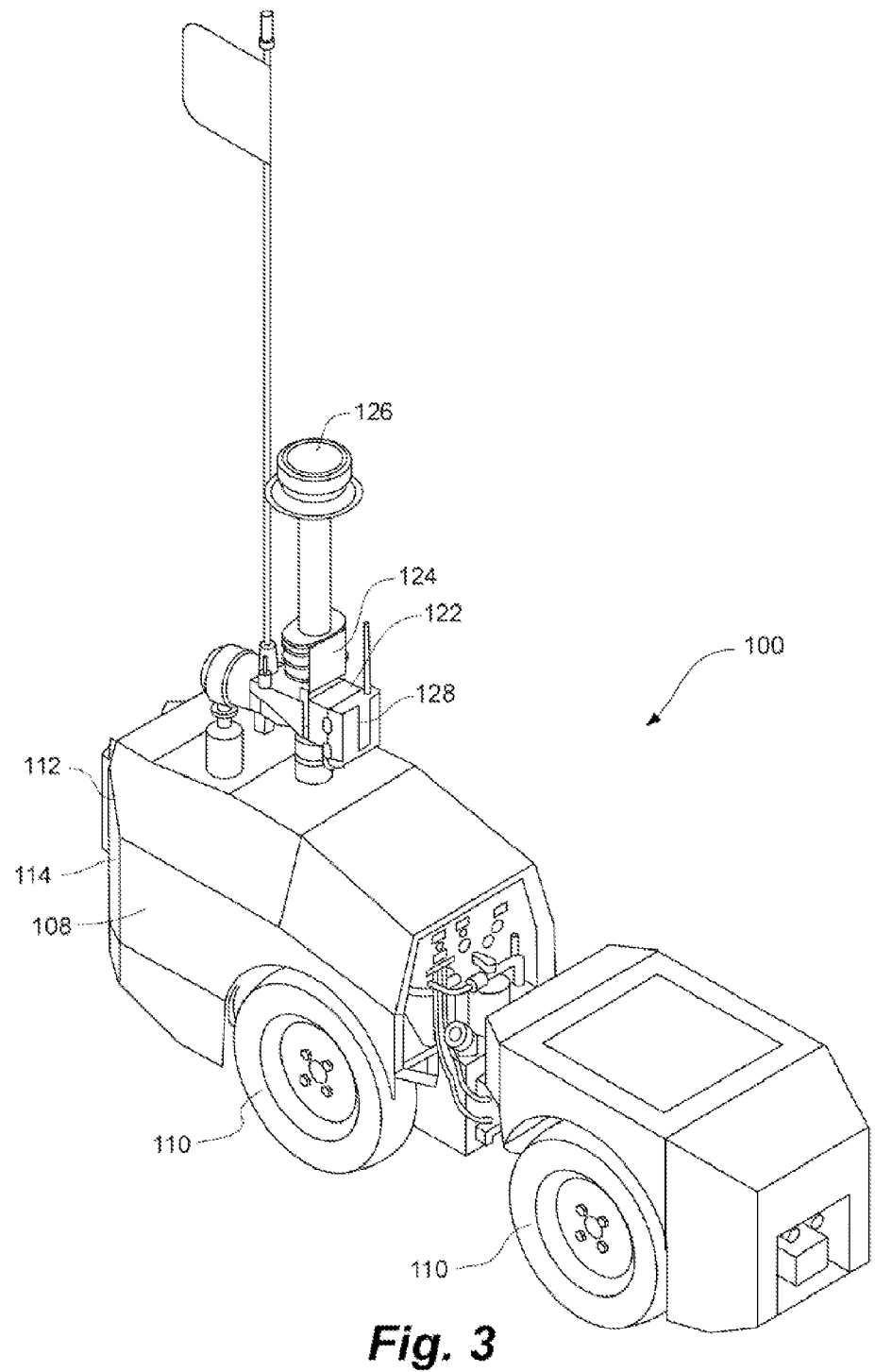
FIG. 3 is a perspective view of an autonomous vehicle platform in accordance with an example embodiment of the invention.
Figure 6:
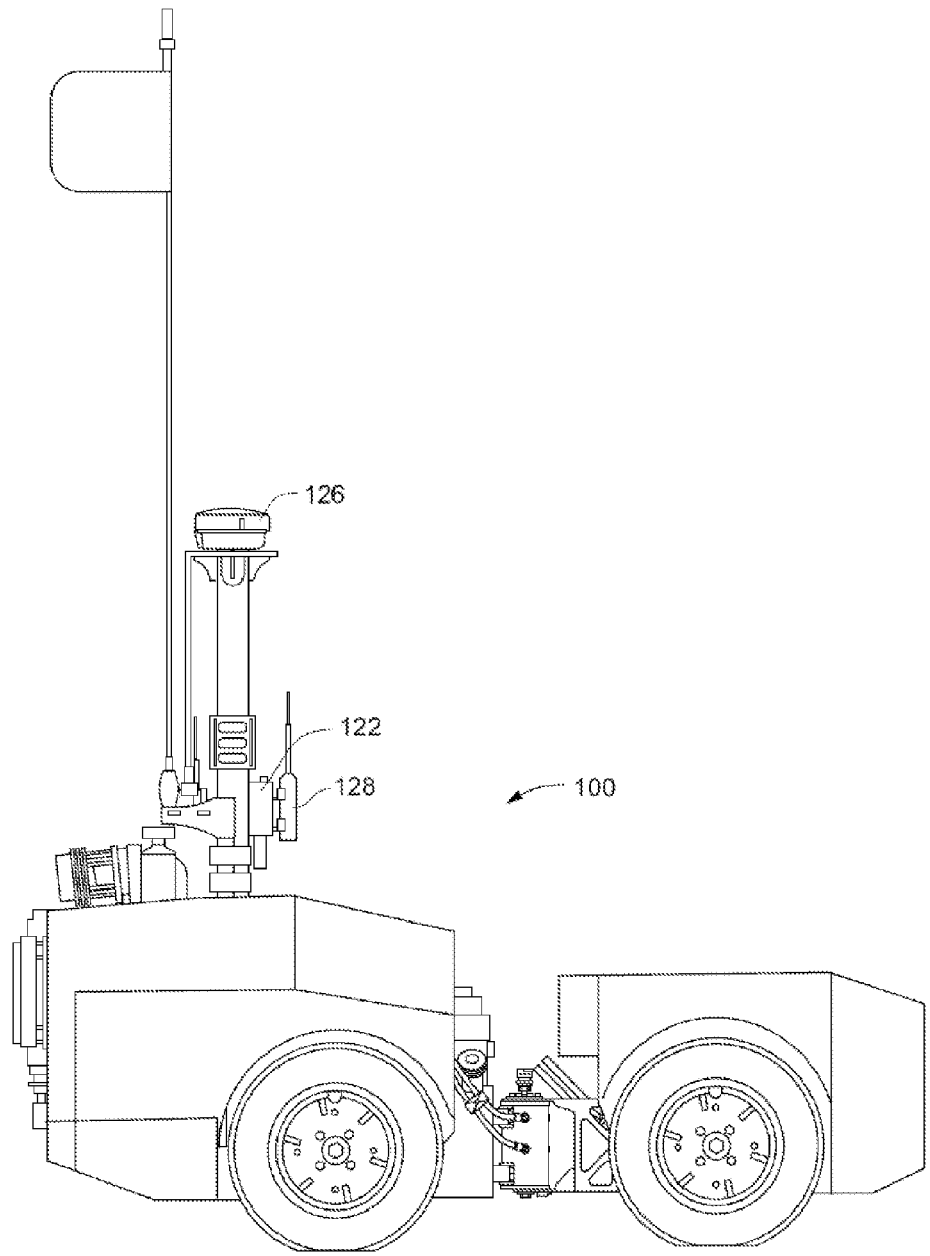
FIG. 6 is a right side view of the autonomous vehicle platform of FIG. 3.
Figure 7:
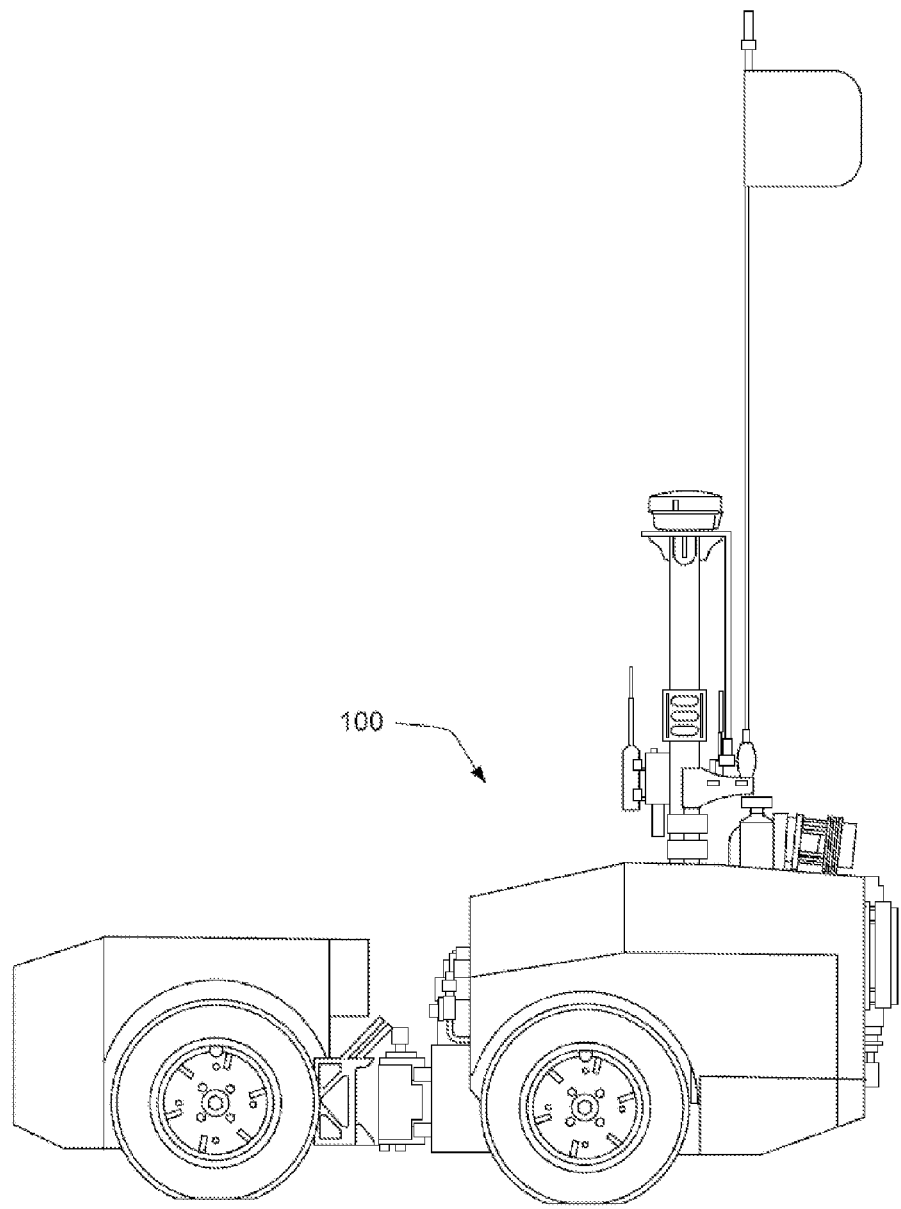
FIG. 7 is a left side view of the autonomous vehicle platform of FIG. 3.
Figure 8:
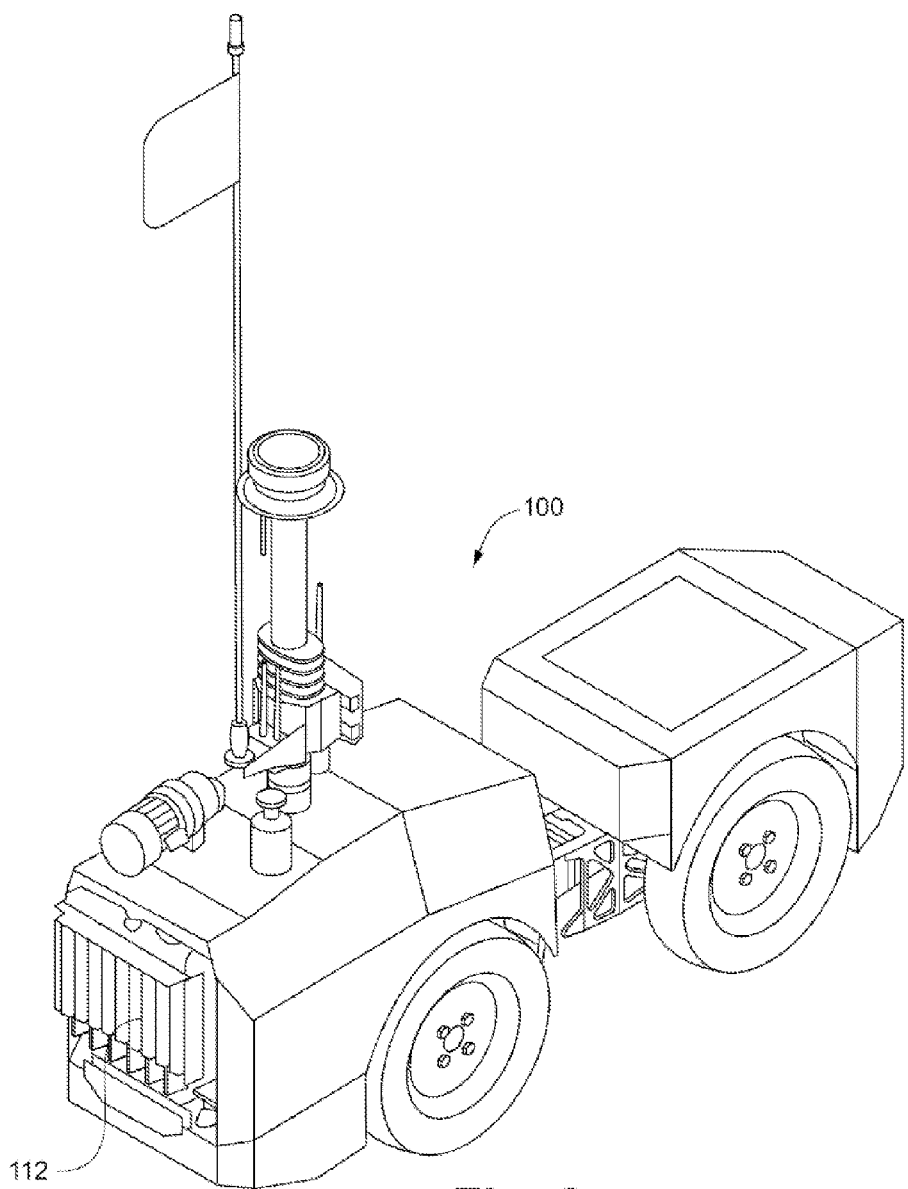
FIG. 8 is a perspective view of the autonomous vehicle platform of FIG. 3.
Figure 9:
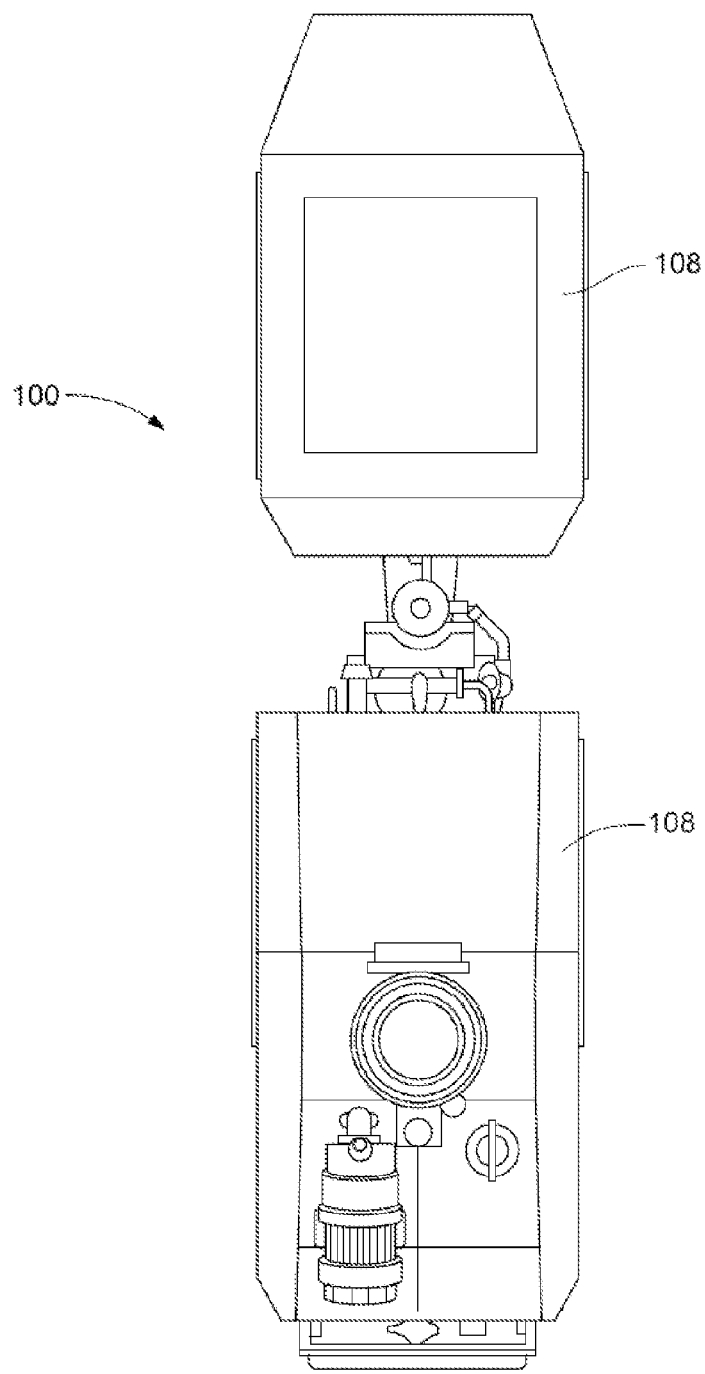
FIG. 9 is a top view of the autonomous vehicle platform of FIG. 3.

Referring to FIGS. 1-2, an autonomous vehicle platform 100 operates in an agricultural field 102, and often between rows 104 of planted crops 106. Examples of planted crops 106 include corn, soybeans, peanuts, potatoes, sorghum, sugar beets, sunflowers, tobacco, cotton, as well as other fruits and vegetables. Like conventional agricultural equipment (either tractor-drawn or self-propelled), autonomous vehicle platform 100 is configured to perform various management tasks. However, unlike conventional agricultural equipment, autonomous vehicle platform 100 is capable of autonomous navigation between rows 104 of planted crops 106, and for taller crops potentially below the canopy formed by the leaves or canopy of the planted crops 106, thereby permitting the performance management tasks when the height of the planted crops 106 precludes access by conventional agricultural equipment, or in other situations where conventional agricultural equipment cannot easily be operated.

Autonomous vehicle platform 100 has a vehicle base 108 with a length L, width W and height H. The width W of the vehicle base 108 is so dimensioned as to be insertable through the space between two rows 104 of planted crops 106. In one embodiment, width W of vehicle base 108 can be dimensioned to be less than about thirty (30) inches wide and can be used in conjunction with rows 104 of planted crops 106 thirty six (36) inches wide (i.e., crops 106 planted on 36 inch centers). In another embodiment, width W of vehicle base 108 can be dimensioned to about twenty (20) inches wide and can be used in conjunction with rows of planted crops 106 thirty (30) inches wide. In one embodiment, the height H of the vehicle base 108 is so dimensioned as to preclude interference with the canopy of the planted crops 106, thereby permitting travel between rows 104 of tall planted crops 108, without being limited by the height of the planted crops 104, or causing damage to planted crops 104.

Referring to FIGS. 3-9, in one embodiment, autonomous vehicle platform 100 has a plurality of ground contacting wheels 110, tracks, or some combination thereof to move across agricultural field 102. Ground contacting wheels can be operably coupled to vehicle base 108. Autonomous vehicle platform 100 can operate effectively across a range of surface conditions created by different cultivation methods (e.g., no-till, low-till, strip-till, and conventional tillage), and on different soil 103 types with different crops 106 planted the previous year (i.e., over a range of plant residue conditions). In addition, the autonomous vehicle platform 100 can operate on soils 103 that would be too wet for conventional equipment. Given the combination of relatively uneven surfaces and potentially soft ground conditions, in some embodiment, the size of ground contacting wheels 110 is maximized. In one embodiment, autonomous vehicle platform 100 has two or more wheels 110. For example, ground contacting wheel 110 could be a drum whose width spans the width W of the vehicle base 106. In such an embodiment, autonomous vehicle platform 100 can have as few as two ground contacting wheels 110. In other embodiments, autonomous vehicle platform 100 can include three or four ground contacting wheels 110. A greater number of wheels can also be employed. In one embodiment autonomous vehicle platform 100 can have one or more track, possibly in combination with one or more ground contacting wheels 110.

The autonomous vehicle platform 100 has at least one powertrain 112 fixedly coupled to vehicle base 108 and operably coupled to at least one ground contacting wheel 110. In one embodiment, an internal combustion engine 114, fueled by diesel or gasoline, can be the main power source for powertrain 112. In another embodiment a battery can be the main power source for powertrain 112. In yet another embodiment, a conventional engine 114 can be paired with a battery to create a hybrid power system; in this configuration, for example, the battery can power an electrical powertrain 112 and the engine can charge the batteries. In one embodiment, the main power source for powertrain 112 can operate continuously for more than 20 hours per day.

Figure 10:
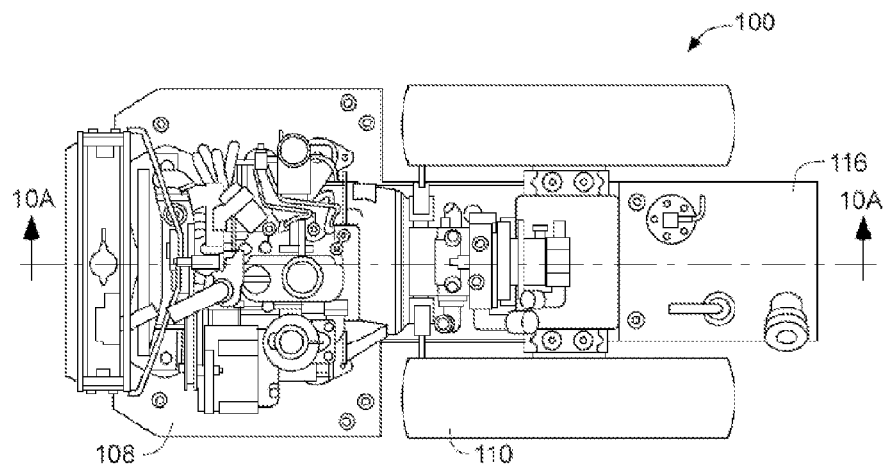
FIG. 10 is a top view of a tank of an autonomous vehicle platform in accordance with an example embodiment of the invention.
Figure 10A:
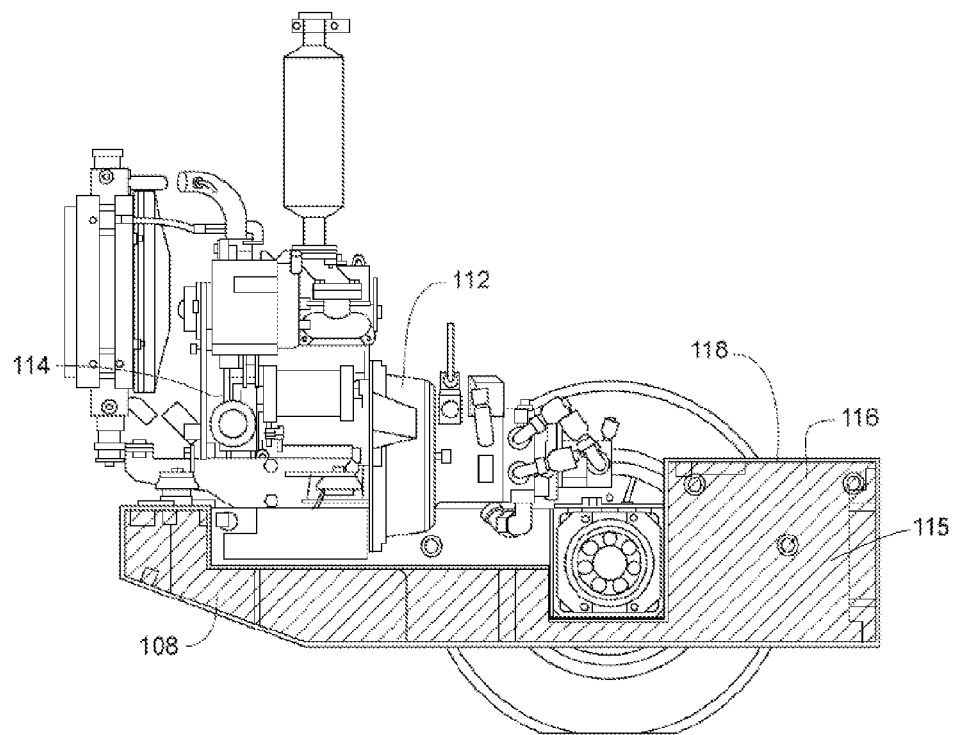
FIG. 10A is a cross sectional view of the tank FIG. 10.
Figure 11:
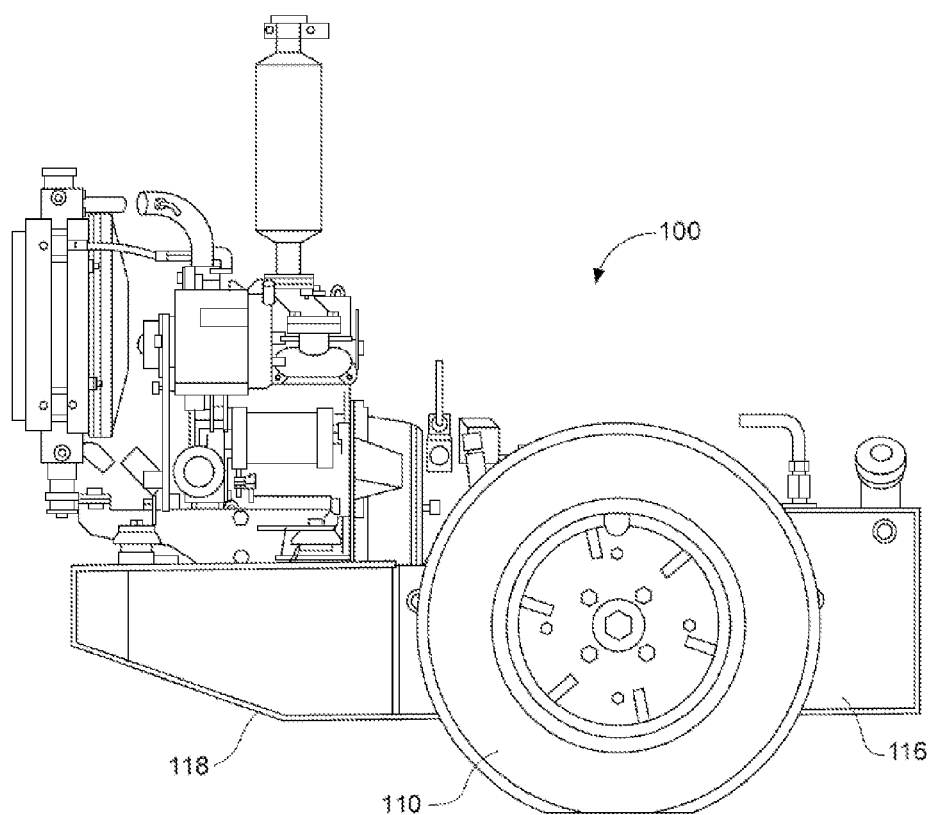
FIG. 11 is a right side view of the tank FIG. 10.

Referring to FIGS. 10-11, in one embodiment, autonomous vehicle platform 100 can include tank 116. In one embodiment, tank 116 can supply the fuel to engine 114. Tank 116 can be employed to carry other substances instead of fuel, for example tank 116 can be configured to carry fertilizer, agricultural chemicals, seeds, water, or a combination thereof for use in performing in-season management tasks. In one embodiment, tank 116 can contain a series of distinct subsections, wherein each subsection is devoted to storage of a given substance. For example, a single tank can contain a first subsection for fuel storage, and a second subsection for storage of liquid fertilizer.

Given the limitations in size of autonomous vehicle platform 100, particularly in the maximum width W and height H that will allow the autonomous vehicle platform 100 to perform the various in-season management tasks between planted rows 104, tank 116 is restricted in size. Additionally, given the range of surface conditions that autonomous vehicle platform 100 must traverse in operation, it is also important to maintain balance and a low center of gravity. Reduction in the overall weight of autonomous vehicle platform is also a consideration. In one embodiment, tank 116 can be slung even with, or below the center of the wheels 110, thereby lowering the center of gravity of the tank 116 and increasing stability of autonomous vehicle platform 100. In one embodiment, the frame 118 of vehicle base 108 is integrated into tank 116. In this embodiment, tank 116 serves as both a reservoir for a payload, as well as the structural support for autonomous vehicle platform 100. In this embodiment, the combination of tank and frame contributes to a lower center of gravity.

In one embodiment, tank 116 can comprise in internal space 170 enclosed within a series of rigid walls 172, wherein at least a portion of the rigid walls 172 are configured provide structural support beyond that necessary to define internal space 170. Rigid walls 172 can be constructed of a heavy gauge metal or other rigid material configured withstand the external forces experienced by autonomous vehicle platform in operation without significant deformation, thereby precluding the requirement for additional frame support. Tank 116 can include one or more inlet 174, outlet 176 or valve 178 capable of creating a fluid connection between the interior 170 and exterior of tank 116. In one embodiment, rigid walls 172 include one or more engine mounts 180 and one or more ground contacting wheels mounts 182.

In one embodiment, one or more baffle 120 can be added to limit sloshing of the contents within tank 116. For example, in one embodiment, baffle 120 can run from length-wise along vehicle base 108 separating a right and left portion of tank 116. In one embodiment, automated valves or pumps can be used to permit passage of the contents of tank 116 from one tank compartment to another. For example, where a baffle 120 exist to separate a right and left portion of tank 116, if it is known that autonomous vehicle platform 100 will soon encounter a side slope, the contents of tank 116 can be transferred from one side to the other to improve stability.

Figure 13:
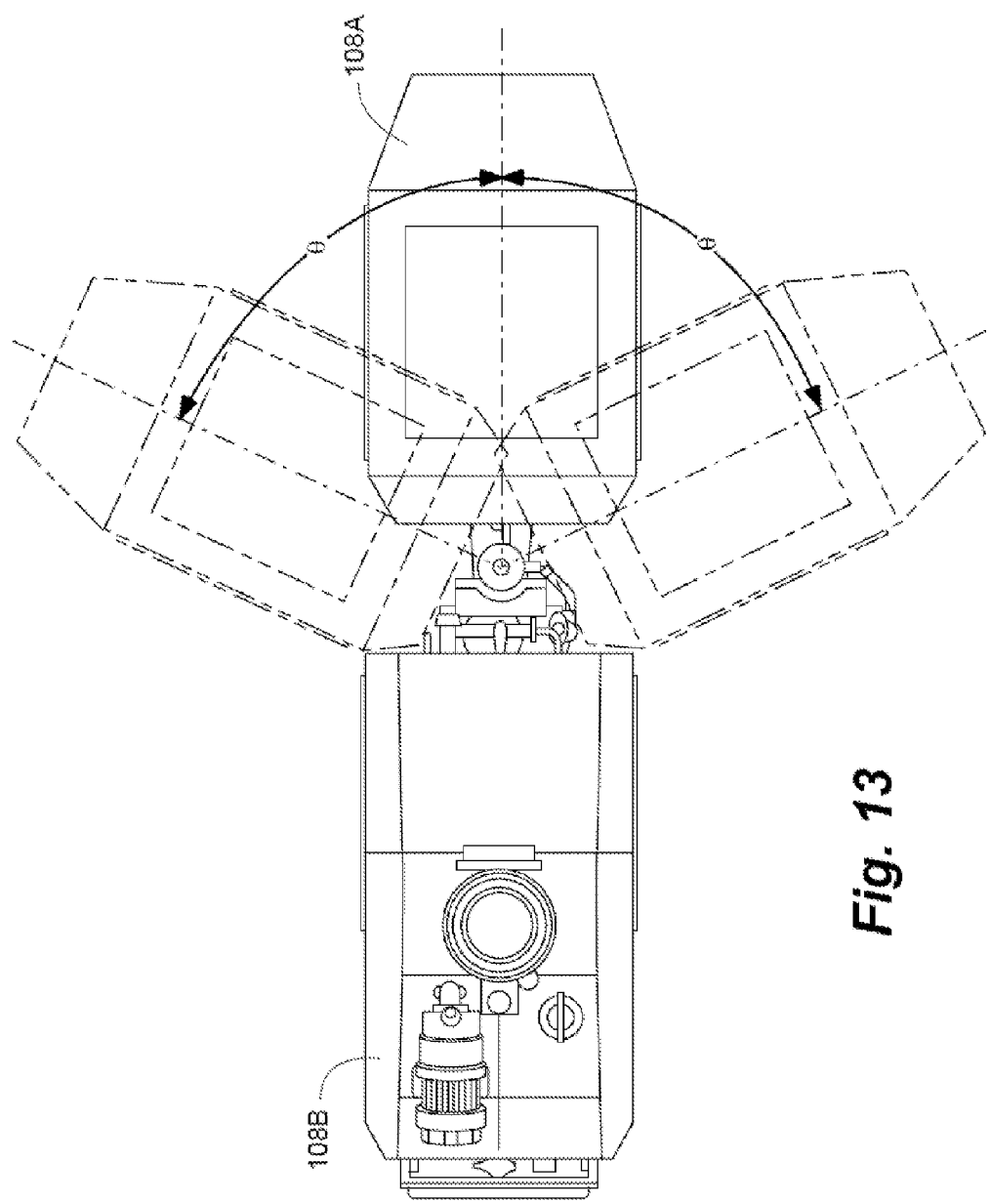
FIG. 13 is a top view of the autonomous vehicle platform of FIG. 12 showing the maximum pivot angle between the first and second portions.

Referring to FIGS. 12-13, in one embodiment, vehicle base 108 can be articulated. In particular, aside from the size, balance and weight restrictions noted above, autonomous vehicle platform 100 is also required to execute tight turns to prevent excessive damage to planted crops 106 when moving from one planted row 104 to the next. Moreover, autonomous vehicle platform 100 is expected to make these turns in a timely manner, without a significant delay. Accordingly, in one embodiment, vehicle base 108 includes a plurality of portions or sections pivotably coupled to one another. In this manner, pivoting one portion relative to another portion allows autonomous vehicle platform 100 to decrease its radius of turn. Further, actively pivoting one portion relative to another portion allows autonomous vehicle platform 100 to steer itself. By articulating frame 118 for steering, it is possible to avoid the requirement for wheels with independent steering that pivot relative to frame 118 and project beyond the autonomous vehicle platform width W when turning or steering between rows. Accordingly, in one embodiment, the articulating frame 118 enables tight turns at the end of the row or steering between rows with adjustments to the steering angle that can be made without the wheels sticking out from frame 118 thereby allowing maximization of width W of autonomous vehicle platform for a given row spacing, as well as to lower the center of gravity for a given payload.

In one embodiment, vehicle base 108 is comprised of a first portion 108A and a second portion 108B, wherein first portion 108A is pivotably coupled to second portion 108B via coupling 109. In one embodiment, coupling 109 can be an active pivotal coupling that utilizes hydraulic fluid to force-ably pivot first portion 108A relative to second portion 108B. For example, in one embodiment, coupling 109 can be a hydraulically-powered joint. In another embodiment, coupling 109 can be an electric steering motor. Where the vehicle base 108 includes a plurality of portions, each portion can comprise a separate tank 116. In some embodiments, the frame 118 of vehicle base 108 is integrated into the plurality of tanks 116A and 116B.

In one embodiment, coupling 109 permits first portion 108A to pivot relative to second portion 108B substantially along a single plane of motion, thereby permitting autonomous vehicle platform a tighter radius of turn. First portion 108A can be pivoted relative to second portion 108B to a maximum angle of θ in either direction. In one embodiment, θ can be substantially equal 60 degrees. In another embodiment, coupling 109 permits first portion 108A to pivot relative to second portion 108B substantially along two planes of motion, thereby allowing both a tighter radius of turn and increased flexibility when traversing a mound or other uneven terrain. In another embodiment, coupling 109 permits twisting of first portion 108A to pivot relative to second portion 108B, thereby increasing the stability and ground contact when traversing uneven terrain.

Referring again to FIGS. 3-9, in one embodiment, the autonomous vehicle platform 100 includes microprocessor 122 in communication with various modules, wherein each module is constructed, programmed, configured, or otherwise adapted, to carry out a function or set of functions. The term module as used herein means a real-world device, component, or arrangement of components implemented using hardware, or as a combination of hardware and software, such as by a microprocessor and a set of program instructions that adapt the module to implement the particular functionality, which while being executed transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed in microprocessor 122. Accordingly, each module can be realized in a variety of suitable configurations, and should generally not be limited to any particular implementation exemplified herein, unless such limitations are expressly called out. In addition, a module can itself be composed of more than one submodules, each of which can be regarded as a module in its own right. Moreover, in the embodiments described herein, each of the various modules corresponds to a defined functionality; however, it should be understood that in other contemplated embodiments, each described functionality may be distributed to more than one module. Likewise, in other contemplated embodiments, multiple defined functionalities may be implemented by a single module that performs those multiple functions, possibly alongside other functions, or distributed differently among a set of modules than specifically illustrated in the examples herein.

In one embodiment, autonomous vehicle platform 100 has a navigation module 124. Navigation module 124 can be configured to receive field orientation information and detect obstacles using a variety of inputs, including existing data about a particular agricultural field 102, as well as navigational data acquired in real time, such as data acquired via onboard cameras, radio communication with a base station, and global positioning system GPS units. A mast 126 can be in communication with the navigation module 124 to allow for an extended range and improved reception beneath the canopy of the planted crops 106.

Microprocessor 122 can be programmed with a self-direction program and can be in communication with navigation module 124 and other implements or modules, to autonomously navigate the autonomous vehicle platform, and to avoid other autonomous vehicle platforms 100, while selectively performing various in-season management tasks based in part on received field orientation information and detected obstacles. For example, an agricultural field 102 can contain various rocks, debris, and other objects that might obstruct the movement of autonomous vehicle platform 100. Small animals, including pets, as well as humans young and old, can also be encountered by the autonomous vehicle platform 100. The autonomous vehicle platform 100 can have onboard capabilities to detect, avoid, navigate around, or as appropriate navigate over a range of obstacles like these. Additionally, when more than one autonomous vehicle platform 100 is autonomously navigating in an agricultural field, the autonomous vehicle platform 100 can communicate with other autonomous vehicle platforms 100 in order to coordinate activities and avoid collisions. In one embodiment, autonomous operation of the autonomous vehicle platform 100 can be managed and selectively overridden.

The autonomous vehicle platform 100 can have a user interface module 128 in communication with microprocessor 122, configured to transmit microprocessor data to a user of autonomous vehicle platform 100, and further configured to receive command data from the user of autonomous vehicle platform 100 for selectively overriding the self-direction program. For example, in one embodiment, a user can receive video and other sensor data remotely via wireless communications, and send control signals to selectively override autonomous vehicle platform 100 automation. In one embodiment, the user can selectively interact in real time via an application on a mobile device, such as a smartphone or tablet, which communicates directly, or indirectly via a server, with the autonomous vehicle platform 100 from an onsite location, or a remote location, such as the service contactor or farm headquarter.

Figure 14:
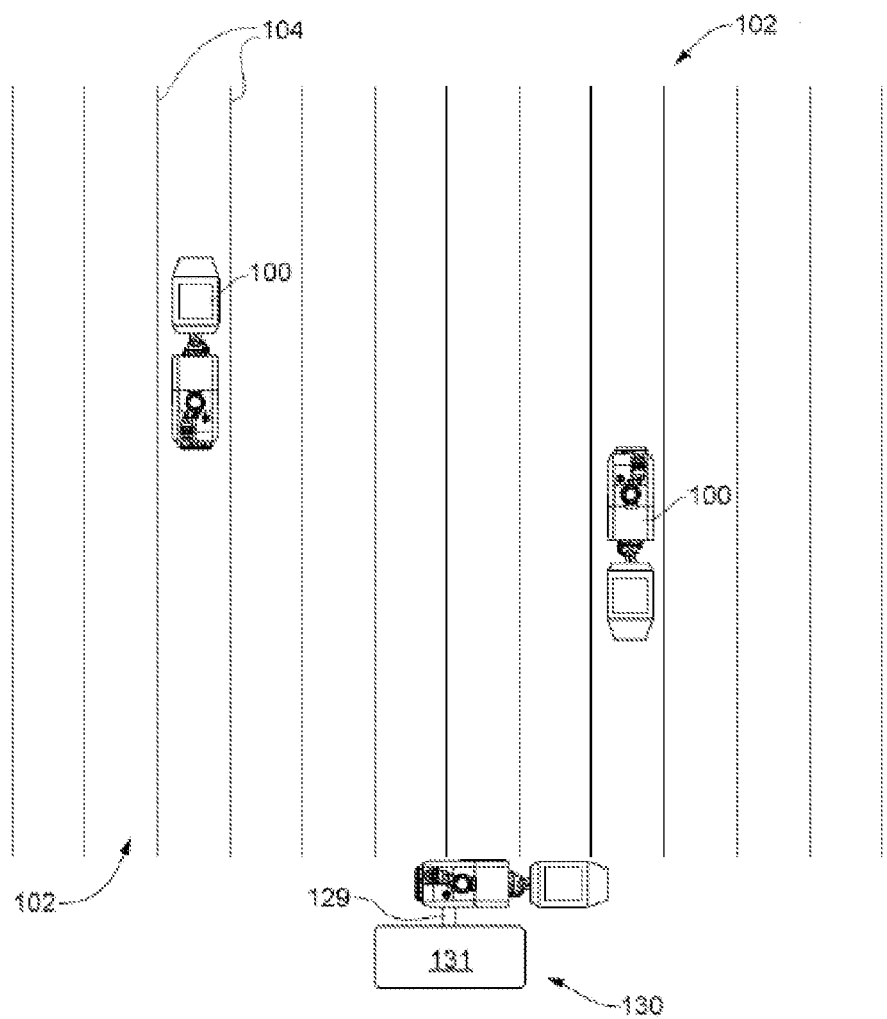
FIG. 14 is a top view of an autonomous vehicle platform system having a fertilization structure in accordance with an example embodiment of the invention.
Figure 17:
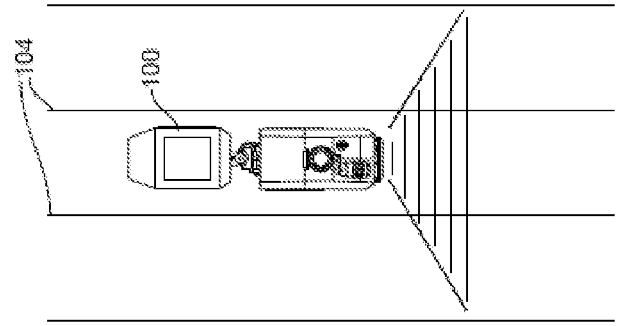
FIG. 17 is a top view of an autonomous vehicle platform applying fertilizer to the base of planted crops in accordance with an example embodiment of the invention.

Referring to FIG. 14, in one embodiment, one or more autonomous vehicle platform 100 can be used together in an autonomous vehicle platform system 200. In one embodiment, autonomous vehicle platform system can further comprise a refilling station 130. Refilling station 130 can include a refilling tank 131 and a refilling applicator 129. In this embodiment, autonomous vehicle platform 100 can be programmed to periodically return to refilling station 130. In one embodiment, the refilling process can be automated. In one embodiment, autonomous vehicle platform 100 can be programmed to compare the status of autonomous vehicle platform criteria to a programmed threshold, and to return to a refilling station 130 for servicing when the status of autonomous vehicle platform criteria conforms to the programmed threshold. For example, autonomous vehicle platform 100 can be programmed with a low threshold of fuel or fertilizer; when autonomous vehicle platform 100 senses that the actual amount of fuel or fertilizer is at or below the programmed low threshold, autonomous vehicle platform 100 can autonomously navigate itself to refilling station 130. In one embodiment, a plurality of autonomous vehicle platforms 100 communicate with each other to avoid conflicts while returning to refilling station 130 to recharge their supply of agricultural chemicals, seeds, fuel, water, or other supplies.

In one embodiment, the placement of refilling station 130 can be guided by a logistics software program. The logistics software program can account for the anticipated quantities of supplies to be used. These anticipated quantities can be computed using a variety of inputs, including the field layout, topography, soil condition, and anticipated weather conditions, and other conditions that may increase or decrease the amount of fuel, fertilizer, agricultural chemicals, seed, water, or combination thereof to be used. In one embodiment, the goal of the logistics software is to minimize the time a given autonomous vehicle platform 100 is traveling to and from the refilling station 130 to refill tank 116. In one embodiment, the refilling station 130 can have one or more retractable hose that can be pulled several rows 104 into agricultural field 102 thereby relocating the refilling applicator some distance from the tank. In one embodiment a refilling station 130 can have a plurality of retractable hoses, creating several refilling locations from a single refill tank 116.

Among other logistics solutions required for optimal operation, autonomous vehicle platform 100 can carry a pre-calculated payload needed to complete an in-season management task from the perspective of the refilling station 130. This pre-calculated amount of fuel and fertilizer goes hand in hand with appropriately sizing tank 116. Pre-calculating the amounts of amount of fuel, fertilizer, agricultural chemicals, seed, water, or combination thereof prevents autonomous vehicle platform 100 from having to transit more than once over the same path between rows 104.

Referring to FIGS. 15-19, in one embodiment autonomous vehicle platform 100 can include an in-season management task structure 132. In one embodiment, the in-season management task structure 132 is one of a fertilization structure, a protective chemical application structure, a field mapping structure, a soil sampling structure, a seeding structure, and a combination thereof. The term "in-season management task structure" is not intended to limit the variety of management task applications only to the in-season timeframe; rather the term is employed to indicate that the variety of management task applications can also be used during the in-season timeframe. For example, the autonomous vehicle platform 100 can be employed to automate some functions, such as fertilizing, application of protective chemicals, mapping, soil sampling, seeding, and a combination thereof, outside of the in-season timeframe.

With special reference to FIG. 15, in one embodiment, autonomous vehicle platform 100 can include a fertilization structure 134. In one embodiment, fertilization structure 134 can comprise a fertilizer tank 136, a fertilization applicator 138 and a fertilization module 140. In one embodiment, tank 116 can comprise fertilizer tank 136. In one embodiment, fertilization structure 134 can be in communication with microprocessor 122, via fertilization module 140. Fertilization applicator 138 can be configured to selectively apply fertilizer to the soil 103 of an agricultural field 102 or base of planted crops 106. Fertilization applicator 138 can be positioned in front, underneath, or behind the wheels 110 (or tracks), or on the wheels 110 of autonomous vehicle platform 100.

The autonomous vehicle platform 100 can utilize a liquid fertilizer known as UAN (urea-amonium-nitrate), other liquid, dry, or granular fertilizers. In one embodiment, the fertilizer tank 136 can hold less than 20 gallons of UAN. In another embodiment, the fertilizer tank 136 can hold less than 40 gallons of UAN. In another embodiment, the fertilizer tank 136 can hold less than 50 gallons of UAN. In embodiments that include an articulated base with a plurality of portions, the fertilizer tank can hold more than 50 gallons of UAN. The fertilization tank 136 can be pressurized by compressed air, which can be supplied from a central compressor to aid in the delivery of fertilizer. Alternatively, the fertilizer can be pumped from the fertilization tank 136 into the fertilization applicator 138. Automated valves and pumps can further be used to inject the fertilizer solution into the soil 103.

Figure 16:
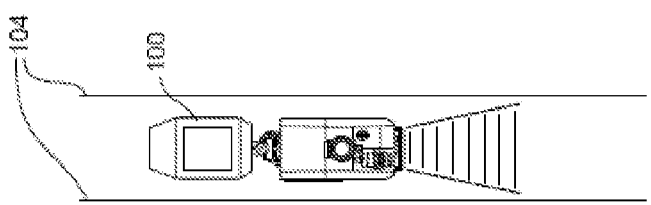
FIG. 16 is a top view of an autonomous vehicle platform applying fertilizer substantially between two rows of planted crops in accordance with an example embodiment of the invention.

With special reference to FIG. 16, in some embodiments, fertilizer can be applied substantially between two rows 104 of planted crops 106; in this manner the autonomous vehicle platform 100 effectively treats one half of each row of planted crop 106. With special reference to FIG. 17, in other embodiment, fertilizer can be applied in a combination of locations, including one or more locations besides substantially between two rows 104 of planted crops 106, including application of fertilizer proximate to the base of planted crops 106. In this manner autonomous vehicle platform 100 effectively treats two rows of planted crop 106 on each pass, thereby doubling its coverage in comparison to fertilization substantially between two rows 104 of planted crops 106.

Referring again to FIG. 15, depending on a range of variables, including soil type, soil moisture, and plant residue, various approaches can be used for applying fertilizer. In one embodiment, autonomous vehicle platform 100 can include a spray nozzle 142 to spray fertilizer on soil 103. In one embodiment, autonomous vehicle platform 100 can include a circular disc, or coulter 144, that cut slots into the soil 103. The fertilizer can be sprayed into this slot directly behind coulter 144. In one embodiment, a protective metal knife can be used directly behind the coulter 144, with a tube passing down behind the knife to introduce the fertilizer solution into soil 103. In some embodiments, weights can be added to the autonomous vehicle platform 100 to ensure sufficient downward pressure to operate the coulter 144.

In one embodiment, autonomous vehicle platform 100 can include multi-pronged wheels or spiked drums—like those that are used on agricultural cultivators to aerate soil. Fertilizer can be injected either through the middle of these prongs or spikes while in contact with soil 103, or subsequent to ground contact by fertilization applicator 138 in the hole left after the spiked drum has passed over soil 103.

In one embodiment, fertilization applicator 138 can be incorporated into the sidewall of one or more wheels 110. In this embodiment, a spray nozzle or the like can be momentarily pulsed on at some point during the arc of the wheel 110 motion. The stream produced from the spray nozzle can be focused on the soil or proximate to the base of a planted crop 106 for a specified duration of time, thereby allowing direct, concentrated application of fertilizer.

In another embodiment, autonomous vehicle platform 100 can apply dry fertilizer pellets in a precise manner directly proximate to the base of a planted crop 106 or substantially between rows of planted crops 108, for example, by broadcasting the pellets, or by injecting the pellets several inches into the soil in a manner that does not damage the crop's root system. In one embodiment, a rolling, spiked drum is used for this purpose. In another embodiment, autonomous vehicle platform 100 "shoots" pellets into the ground using a high-pressure air system much like what is found in air rifles that fires a BB or a pellet. Fertilizer can be applied on either side of autonomous vehicle platform 100.

When a UAN solution is sprayed proximate to the base of planted crops 106, a stabilizer can be added to prevent hydrolysis of the urea to ammonia gas lost to the atmosphere through volatilization. However, rain or application of irrigation water following fertilizer application can eliminate the need to treat the UAN with a stabilizer. A focused spray to specifically avoid application to crop residue can eliminate the amount of fertilizer inadvertently immobilized.

In addition to application of fertilizer as a spray proximate to the base of planted crops 104, the autonomous vehicle platform 100 can follow the fertilizer application with a spray of water, as "simulated rain." Thus, the autonomous vehicle platform 100 can have two tanks, one for fertilizer 130 and one for water. The simulated rain application helps to wash the UAN fertilizer into the soil, thereby reducing hydrolysis on the soil 103 surface.

In one embodiment, autonomous vehicle platform 100 can monitor fertilization. For example, monitoring of the flow of nutrients into the soil 103 can be provided to a user during fertilizing operations. In one embodiment, autonomous vehicle platform 100 can detect and rectify a situation where soil 103 becomes stuck to the fertilization applicator 138, spray nozzle 142, coulter 144, or other parts of the fertilization structure 134. In one embodiment, autonomous vehicle platform 100 can be equipped to monitor the depth at which fertilizer is injected.

Use of the autonomous vehicle platform 100 can also be guided by external inputs, such as weather data. For example, a decision on whether to fertilize at a given point in time can be influenced by inputs like weather data that ultimately predict the effectiveness of applying fertilizer within a given time window. For example, fertilizing operations early in the season can be delayed if a predicted rain storm is likely to wash a substantial portion of the added fertilizer off the field. Alternatively at other times, fertilizing applications might be time in advance of a rain storm if that predicted moisture would help move the fertilizer down through the soil profile to the crops' roots.

In some embodiments, autonomous vehicle platform can include a protective chemical application structure, configured to apply one of a herbicide, a pesticide, a fungicide, or a combination thereof to planted crops 104 or other vegetation including unwanted weeds. In some embodiments, autonomous vehicle platform 100 can detect which planted crops 104 needs a particular protective chemical or combination thereof and apply that protective chemical or combination thereof using a sprayer on a mast or a robotic arm. Such an approach can have the potential of reducing the volume of protective chemicals applied.

Figure 18:
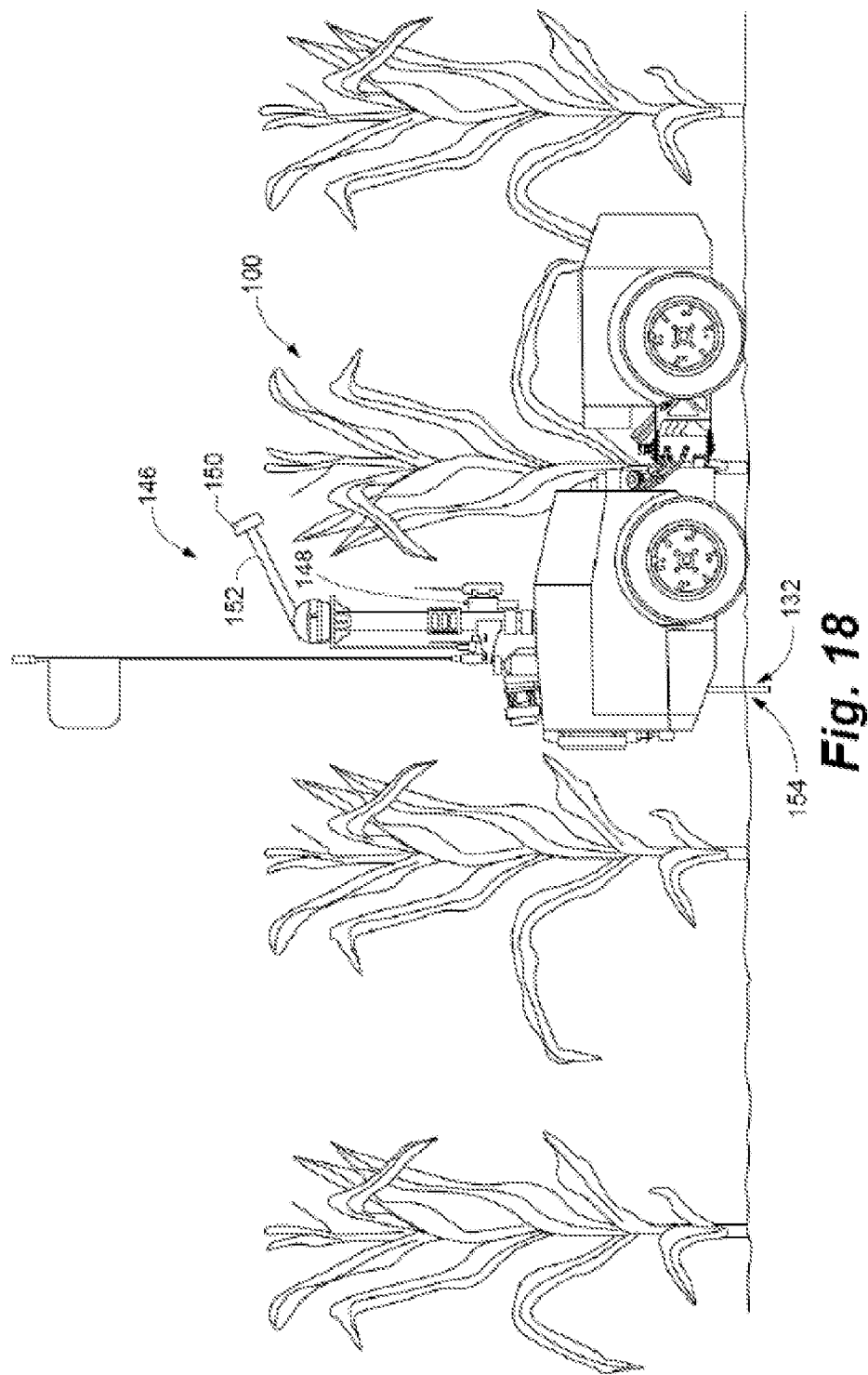
FIG. 18 is a side view of an autonomous vehicle platform system having a field mapping structure and soil sampling structure in accordance with an example embodiment of the invention.

With special reference to FIG. 18, in one embodiment, autonomous vehicle platform 100 can include a field mapping structure 146, configured to map planted crop 108 conditions as well as other parameters. In one embodiment, the goal of the field mapping structure 146 is to guide the application of fertilizer. For example, in areas where planted crop 106 conditions indicate that more or less nutrients are required, the autonomous vehicle platform 100 can adjust fertilizer output as needed.

In one embodiment, fertilization structure 146 can comprise a field mapping module 148 and one or more sensor 150 configured to monitor the conditions of a planted crop 106. For example, sensor 150 can use optical or other measurements to determine the abundance of plant pigments, such as chlorophyll, or other key parameters. In one embodiment, sensor 150 can observe conditions from below planted crops 108. In other embodiment, sensor 108 can be mounted on a robotic arm 152 to observe planted crops 106 conditions above autonomous vehicle platform 100. In one embodiment, mapping module 148 and sensor 150 can be in communication with microprocessor 122.

In one embodiment, autonomous vehicle platform 100 can include a soil sampling structure 154, configured to measure soil conditions, as well as other parameters. In one embodiment, the goal of the soil sampling structure 154 is to guide the application of fertilizer. For example, in areas where soil 103 conditions indicate that more or less nutrients are required, the autonomous vehicle platform 100 can adjust fertilizer output as needed. In one embodiment, soil sampling structure 103 can comprise a soil sampling module 156 and one or more soil probe 158 configured to monitor the conditions of the soil 103. In one embodiment, soil sampling module 156 and soil probe 158 can be in communication with microprocessor 122. In one embodiment, autonomous vehicle platform 100 can insert soil probe 158 into the soil 103, while observing planted crops 106 conditions via sensor 150.

In one embodiment, autonomous vehicle platform 100 can be programmed with an algorithm to improve efficiency in real-time plant monitoring. For example, if autonomous vehicle platform 100 is programmed to stop periodically to take measurements, the algorithm can analyze these measurements to determine how much they vary from one another. Where adjacent measurements do not vary substantially, the algorithm can enable autonomous vehicle platform 100 to increase the distance between monitoring locations, thereby effectively speeding up the monitoring process.

In addition to data collected via sensor 150 and soil probe 158, data from crop planting operations can be used create a "base map" from which the autonomous vehicle platform 100 can navigate. Such a base map can detail the precise location of individual rows 104 of planted crop 106, or even the location of individual plants 106. The base map can also describe the soil 103 types and field topography—including measurements made using LIDAR that describe drainage patterns on a field. A user can further interact with the map, via an interface, adding in expert knowledge. For example, the existence of different crop varieties or typically-wet areas can be added by the user.

Figure 19:
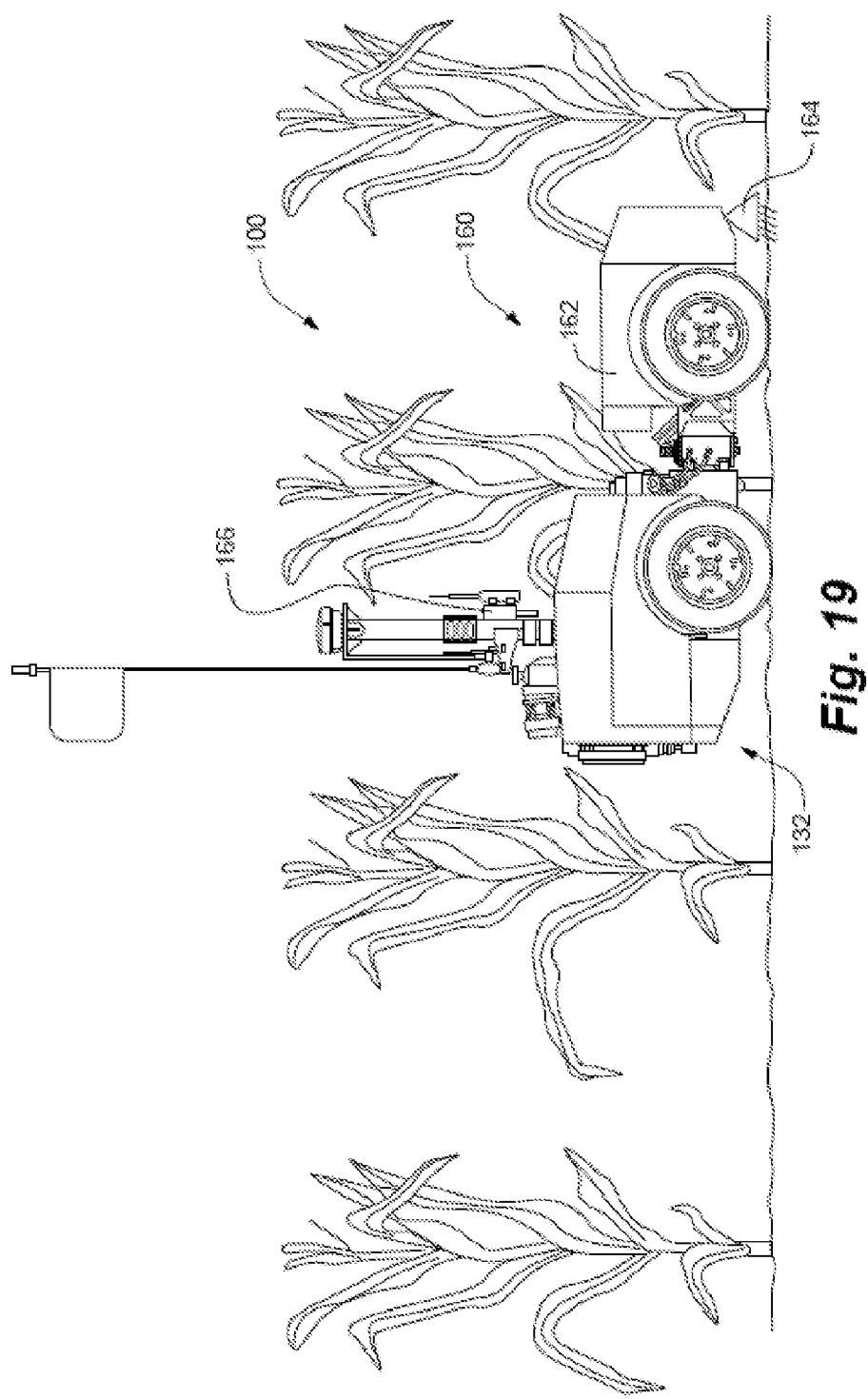
FIG. 19 is a side view of an autonomous vehicle platform system having a seeding structure in accordance with an example embodiment of the invention.

With special reference to FIG. 19, in one embodiment, autonomous vehicle platform 100 can include a seeding structure 160. Seeding structure 106 can be configured to seed a cover crop under tall planted crops 106. In one embodiment, seeding structure 160 can comprise a seed reservoir 162, a seeding attachment 164, and a seeding module 166. Seed reservoir 162 can be coupled to the vehicle base 108 and configured to contain a reservoir of seeds. In one embodiment tank 116 can comprise seed reservoir 162. In one embodiment, the seeds can be mixed in a water solution. The seeds can be seeded via a seeding attachment 164. In one embodiment, the seeds can be further worked into the soil using a range of common tillage methods, such as dragging a metal bar or chain. In one embodiment, seeding module 166 can be in communication with microprocessor 122. In one embodiment, seeding can be performed while fertilizing, or in combination with other management tasks. In another embodiment, seeding can be performed independently of other in-season management tasks.

In operation, a user can deliver one or more autonomous vehicle platforms 100 to an agricultural field 102, position a refilling station 130 proximate the agricultural field 102, and orient the one or more autonomous vehicle platforms 100 to the field 102 and the refilling station 130. This can entail the user placing the one or more of the autonomous vehicle platforms 100 in manual mode and driving the one or more of the autonomous vehicle platforms 100 into a docking position at refilling station 130, however, this is just one example of how to register the refilling station 130 location within each autonomous vehicle platform's 100 navigation module 124.

After delivery, the self-direction program of autonomous vehicle platform 100 can be activated. Autonomous vehicle platform 100 can navigate to a starting point and begin navigating between rows 104 of planted crops 106 while performing an in-season management task. In some embodiments, the autonomous vehicle platform 100 can be operated by a service provider who contracts with farmers to conduct in-season management tasks. In some circumstances, particular areas of the agricultural field 102 can be omitted if prior monitoring has revealed that the crop will not benefit from added fertilizer in that area. In other circumstances, particular areas of the agricultural field 102 can be fertilized for the express purpose of monitoring the planted crop 104 response over subsequent days, such monitoring for a response could be used to guide application of fertilizer to the rest of the field.

Moving one or more autonomous vehicle platforms 100 and refilling stations 130 from field-to-field can be guided by one or more pc- or web-based software programs that a user can access via smartphone, tablet, interface on base station, or personal computer from an onsite location, or a remote location, such as the service contactor or farm headquarters. Such a program can report the progress made by the autonomous vehicle platform 100 on a particular agricultural field 102, as well as overall statistics for a given time period. Accordingly, the user can prioritize fields for treatment. Based, in part, on a user's input, the program can determine the most efficient schedule for refilling tank 116 and where the refilling stations 130 should be located. Via this program, the user is prompted at the appropriate time to begin the process of refilling or moving a refilling station 130 such that the autonomous vehicle platforms 100 can operate as continuously as possible. The logistics software can also schedule maintenance and transport between agricultural fields 102 of the autonomous vehicle platforms 100. The goal of the logistics software is to minimize the time each given autonomous vehicle platform 100 is: transiting between fields, traveling to and from the refilling station 130, waiting in queue to be refilled, or is otherwise not performing in in-season management tasks.

Embodiments of the present disclosure are discussed in detail below. In describing embodiments, specific terminology is employed for the sake of clarity. However, the present disclosure is not intended to be limited to the specific terminology so selected. A person skilled in the relevant art will recognize that other equivalent parts can be employed and other methods developed without parting from the spirit and scope of the present disclosure.

What is claimed is:

1. An autonomous vehicle platform for selectively performing an in-season management task in an agricultural field while self-navigating between rows of planted crops, comprising:
    a vehicle base having a width so dimensioned as to be insertable through the space between two rows of planted crops, the vehicle base comprising a first portion and a second portion, wherein the first portion and the second portion each include at least one ground engaging wheel, and are pivotably coupled to one another by an active pivotal coupling configured to enable pivoting of the first portion relative to the second portion to affect steering of the autonomous vehicle platform;
    at least one powertrain fixedly coupled to the vehicle base and operably coupled to at least one of the ground engaging wheels;
    an in-season management task structure;
    a navigation module; and
    a microprocessor in communication with the in-season management task module and the navigation module, programmed with a self-direction program configured to control the active pivotal coupling to autonomously steer the autonomous vehicle platform while performing an in-season management task.

2. The autonomous vehicle platform of claim 1, wherein the active pivotal coupling is configured to forcibly pivot the first portion relative to the second portion.

3. The autonomous vehicle platform of claim 2, wherein the active pivotal coupling comprises at least one of a hydraulically-powered joint and an electric steering motor to forcibly pivot the first portion relative to the second portion.

4. The autonomous vehicle platform of claim 1, wherein at least one of the first portion and the second portion includes at least one of a ground engaging drum, a pair of ground engaging wheels and a ground engaging track.

5. The autonomous vehicle platform of claim 1, wherein the vehicle base is dimensioned to be substantially 30 inches in width or less.

6. The autonomous vehicle platform according to claim 1, wherein the in-season management task structure is one of a fertilization structure, a field mapping structure, a seeding structure, a protective chemical application structure, a soil sampling structure, and a combination thereof.

7. The autonomous vehicle platform according to claim 6, wherein the in-season management task structure is a fertilization structure configured for selective application of fertilizer to the soil substantially between rows of planted crops.

8. The autonomous vehicle platform according to claim 6, wherein the in-season management task structure is a fertilization structure configured for selective application of fertilizer to the soil proximate the base of planted crops.

9. The autonomous vehicle platform according to claim 1, wherein the navigation module is configured to receive field orientation information and detect obstacles utilizing at least an onboard sensor and a global positioning system unit.

10. The autonomous vehicle platform of claim 1, wherein the vehicle base further includes one or more additional portions pivotably coupled to at least one of the first portion and the second portion.

11. An autonomous vehicle platform system for selectively performing an in-season management task in an agricultural field while self-navigating between rows of planted crops, comprising:
   one or more autonomous vehicle platform comprising:
   a base having a width so dimensioned as to be insertable through the space between two rows of planted crops, the vehicle base comprising a first portion and a second portion, wherein the first portion and the second portion each include at least one ground engaging wheel, and are pivotably coupled to one another by an active pivotal coupling configured to enable pivoting of the first portion relative to the second portion to affect steering of the autonomous vehicle platform;
   at least one powertrain fixedly coupled to the vehicle base and operably coupled to at least one of the ground engaging wheels;
   an in-season management task module;
   a navigation module; and
   a microprocessor in communication with the in-season management task module and the navigation module, programmed with a self-direction program configured to control the active pivotal coupling to autonomously vehicle platform while performing an in-season management task.

12. The autonomous vehicle platform system of claim 11, further comprising one or more refilling stations, wherein each autonomous vehicle platform is programmed to compare the status of autonomous vehicle platform criteria to a programmed threshold and to navigate to the one or more refilling stations for servicing based on said comparison.

13. The autonomous vehicle platform system of claim 11, wherein the active pivotal coupling is configured to forcibly pivot the first portion relative to the second portion.

14. The autonomous vehicle platform system of claim 13, wherein the active pivotal coupling comprises at least one of a hydraulically-powered joint and an electric steering motor to forcibly pivot the first portion relative to the second portion.

15. The autonomous vehicle platform system of claim 11, wherein at least one of the first portion and the second portion includes at least one of a ground engaging drum, a pair of ground engaging wheels and a ground engaging track.

16. The autonomous vehicle platform system of claim 11, wherein the vehicle base is dimensioned to be substantially 30 inches in width or less.

17. The autonomous vehicle platform system according to claim 11, wherein the in-season management task structure is one of a fertilization structure, a field mapping structure, a seeding structure, and a combination thereof.

18. The autonomous vehicle platform system according to claim 17, wherein the in-season management task structure is a fertilization structure configured for selective application of fertilizer to the soil substantially between rows of planted crops.

19. The autonomous vehicle platform system according to claim 17, wherein the in-season management task structure is a fertilization structure configured for selective application of fertilizer to the soil proximate the base of planted crops.

20. The autonomous vehicle platform system according to claim 17, wherein the vehicle base further includes one or more additional portions pivotably coupled to at least one of the first portion and the second portion.

\* \* \* \* \*